US012461460B2

(12) United States Patent
Yamashita et al.

(10) Patent No.: US 12,461,460 B2
(45) Date of Patent: Nov. 4, 2025

(54) METHOD FOR PRODUCING ELECTROSTATIC CHARGE IMAGE DEVELOPING TONER

(71) Applicant: FUJIFILM Business Innovation Corp., Tokyo (JP)

(72) Inventors: Takahiro Yamashita, Kanagawa (JP); Yukiaki Nakamura, Kanagawa (JP); Yoshimasa Fujihara, Kanagawa (JP)

(73) Assignee: FUJIFILM Business Innovation Corp., Tokyo (JP)

( * ) Notice: Subject to any disclaimer, the term of this patent is extended or adjusted under 35 U.S.C. 154(b) by 666 days.

(21) Appl. No.: 17/944,629

(22) Filed: Sep. 14, 2022

(65) Prior Publication Data

US 2023/0305410 A1 Sep. 28, 2023

(30) Foreign Application Priority Data

Mar. 25, 2022 (JP) ................................. 2022-050479

(51) Int. Cl.
*G03G 9/087* (2006.01)
*G03G 9/08* (2006.01)

(52) U.S. Cl.
CPC ....... *G03G 9/0804* (2013.01); *G03G 9/08755* (2013.01)

(58) Field of Classification Search
None
See application file for complete search history.

(56) References Cited

U.S. PATENT DOCUMENTS 8,252,501 B2 8/2012 Maezawa et al.

FOREIGN PATENT DOCUMENTS

| | | | | |
|---|---|---|---|---|
| JP | 2000-131882 A | | 5/2000 | |
| JP | 2010-031096 A | | 2/2010 | |
| JP | 2014-048364 | * | 3/2014 | ............. G03G 9/087 |
| JP | 2017-116777 A | | 6/2017 | |

OTHER PUBLICATIONS

Translation of JP 2014-048364.*

* cited by examiner

*Primary Examiner* — Peter L Vajda
(74) *Attorney, Agent, or Firm* — Sughrue Mion, PLLC

(57) ABSTRACT

A method for producing an electrostatic charge image developing toner includes forming aggregated particles by aggregating at least resin particles in a dispersion liquid containing the resin particles, and fusing/coalescing the aggregated particles by heating an aggregated particle dispersion liquid containing a base having volatility and the aggregated particles dispersed therein in a fusion/coalescence tank which houses the aggregated particle dispersion liquid.

17 Claims, 3 Drawing Sheets

METHOD FOR PRODUCING ELECTROSTATIC CHARGE IMAGE DEVELOPING TONER

CROSS-REFERENCE TO RELATED APPLICATIONS

This application is based on and claims priority under 35 USC 119 from Japanese Patent Application No. 2022-050479 filed Mar. 25, 2022.

BACKGROUND

(i) Technical Field

The present disclosure relates to a method for producing an electrostatic charge image developing toner.

(ii) Related Art

For example, Japanese Unexamined Patent Application Publication No. 2010-031096 discloses a method for producing coalesced resin particles, the method including coalescing aggregated resin particles by flowing, through a pipe, an aggregated resin particle slurry, in which aggregated resin particles produced by aggregating resin fine particles containing at least a resin are dispersed in a liquid medium, in a state of being heated to a predetermined temperature under the pressure applied so that the pressure is 0.5 MPa or more and 15 MPa or less, thereby producing a coalesced resin particle slurry containing coalesced resin particles dispersed in a liquid medium; and cooling the coalesced resin particle slurry, which is flowed through the pipe in a heated pressurized state, to a predetermined temperature and reducing the pressure to a predetermined pressure.

Also, Japanese Unexamined Patent Application Publication No. 2017-116777 discloses a method for producing an electrostatic charge image developing toner containing toner particles containing at least a binder resin and a coloring agent, the method including forming aggregates of binder resin particles and coloring agent particles in an aqueous medium, and fusing the aggregates to form a toner particle dispersion liquid. At least one of aggregation and fusion processes includes removing and discharging the volatile organic material, vaporized by heating, from a reactor in which the toner particle dispersion liquid is formed.

Further, Japanese Unexamined Patent Application Publication No. 2000-131882 discloses a method for producing an electrostatic charge image developing toner, the method including adding an aggregating agent and a stabilizer to an aqueous dispersion liquid containing at least polymer fine particles and coloring agent fine particles to associate the many fine particles, and heat-fusing the associated particles at a temperature equal to or higher than the glass transition temperature of the polymer fine particles. In heat-fusing, the temperature of at least one of the aggregating agent and the stabilizer is changed.

SUMMARY

Aspects of non-limiting embodiments of the present disclosure relate to a method for producing an electrostatic charge image developing toner, the method including forming aggregated particles by aggregating at least resin particles in a dispersion liquid containing the resin particles, and fusing/coalescing the aggregated particles by heating an aggregated particle dispersion liquid in a fusion/coalescence tank which houses the aggregated particle dispersion liquid containing a base having volatility and the aggregated particles dispersed therein. The method has high transfer efficient and suppresses color spots as compared with when the aggregated particles are fused/coalesced in the fusion/coalescence tank which is under atmospheric pressure and in a windless state and has an opening at a total area ratio of less than 5 $cm^2/m^3$ per unit amount of the aggregated particle dispersion liquid.

Aspects of certain non-limiting embodiments of the present disclosure overcome the above disadvantages and/or other disadvantages not described above. However, aspects of the non-limiting embodiments are not required to overcome the disadvantages described above, and aspects of the non-limiting embodiments of the present disclosure may not overcome any of the disadvantages described above.

According to an aspect of the present disclosure, there is provided a method for producing an electrostatic charge image developing toner, the method including forming aggregated particles by aggregating at least resin particles in a dispersion liquid containing the resin particles, and fusing/coalescing the aggregated particles by heating an aggregated particle dispersion liquid containing a base having volatility and the aggregated particles dispersed therein in a fusion/coalescence tank which houses the aggregated particle dispersion liquid. In fusing/coalescing the aggregating particles, at least one condition of conditions (1) to (3) below is satisfied, Condition (1): The fusion/coalescence tank has one or plural openings in an upper portion thereof, and the total area ratio of the openings is 5 $cm^2/m^3$ or more per unit amount of the aggregated particle dispersion liquid, Condition (2): The aggregated particles are fused/coalesced in the fusion/coalescence tank in a state of reduced pressure within a range of (atmospheric pressure−0.5) kPa or less, Condition (3): The aggregated particles are fused/coalesced in a state where a gas is blown into the fusion/coalescence tank with a wind volume of 5 L/min m$^3$) or more per unit amount of the aggregated particle dispersion liquid in the fusion/coalescence tank.

BRIEF DESCRIPTION OF THE DRAWINGS

Exemplary embodiments of the present disclosure will be described in detail based on the following figures, wherein:

FIGS. 1A and 1B are schematic configuration diagrams showing an example of a fusion/coalescence tank used in a method for producing an electrostatic charge image developing toner according an example embodiment of the present disclosure, in which FIG. 1A is a schematic top view of the fusion/coalescence tank and FIG. 1B is a schematic sectional front view thereof;

DETAILED DESCRIPTION

Figure 1A:
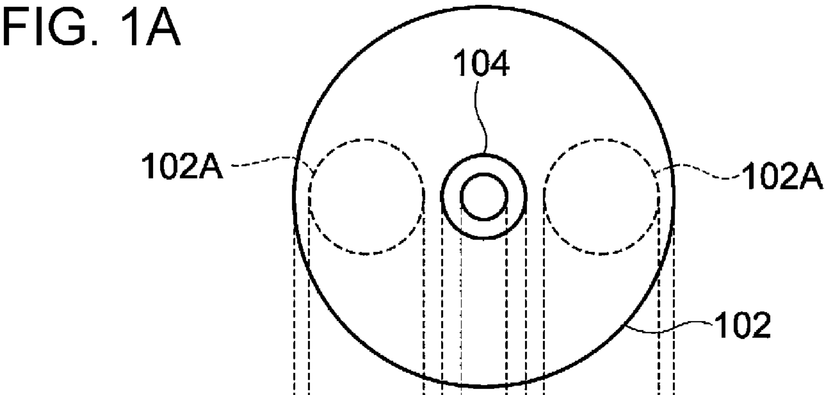

An exemplary embodiment of the present disclosure is described below. The description and examples are illustrative of the present disclosure, and the present disclosure is not limited to these.

In the present specification, a numerical range shown by using "to" represents a range including the numerical values described before and after "to" as the minimum and maximum values, respectively.

In the numerical ranges stepwisely described in the present specification, the upper limit value or the lower limit value described in one of the numerical ranges may be replaced by the upper limit value or the lower limit value in another numerical range stepwisely described. In addition, in a numerical range described in the present specification, the upper limit value or the lower limit value of the numerical range may be replaced by the value described in an example.

In the specification, the term "process" includes not only an independent process but also even a process which cannot be clearly distinguished from another process as long as an expected object of the process is achieved.

When in the present specification, an exemplary embodiment is described with reference to the drawings, the configuration of the exemplary embodiment is not limited to the configuration shown in the drawings. Also, the size of a member in each of the drawings is conceptual, and the relative relationship between the member sizes is not limited to this.

In the present specification, each component in a composition may contain plural materials corresponding to the component. In description of the amount of each of the components in a composition in the present disclosure, when plural materials corresponding to each of the components are present in a composition, the amount of each of the components represents the total amount of the plural materials present in the composition unless otherwise specified.

In the present specification, an electrostatic charge image developing toner is also referred to as a "toner".

In the present specification, a "base having volatility" represents a base having a boiling point of 100° C. or less under atmospheric pressure.

<Method for Producing Toner>

A method for producing a toner according to an exemplary embodiment of the present disclosure includes forming aggregated particles by aggregating at least resin particles in a dispersion liquid containing the resin particles (also referred to as "aggregation" hereinafter), and fusing/coalescing the aggregated particles by heating an aggregated particle dispersion liquid containing a base having volatility and the aggregated particles dispersed therein in a fusion/coalescence tank which houses the aggregated particle dispersion liquid (also referred to as "fusion/coalescence" hereinafter).

In addition, a method for producing a toner according to a first exemplary embodiment satisfies at least one of Conditions (1) to (3) below in fusing/coalescing the aggregated particles.

Condition (1): The fusion/coalescence tank has one or plural openings in an upper portion thereof, and the total area ratio of the openings is 5 $cm^2/m^3$ or more per unit amount of the aggregated particle dispersion liquid.

Condition (2): The aggregated particles are fused/coalesced in the fusion/coalescence tank in a state of reduced pressure within a range of (atmospheric pressure−0.5) kPa or less.

Condition (3): The aggregated particles are fused/coalesced in a state where a gas is blown into the fusion/coalescence tank with a wind volume of 5 L/(min·$m^3$) or more per unit amount of the aggregated particle dispersion liquid in the fusion/coalescence tank.

On the other hand, a method for producing a toner according to a second exemplary embodiment includes fusing/coalescing the aggregated particles under a condition in which the amount of the base in the aggregated particle dispersion liquid at the time of reaching the fusion/coalescence temperature of the aggregated particle dispersion liquid is 10% by mass or more and 98% by mass or less relative to the amount of the base in the aggregated particle dispersion liquid at the start of heating of the aggregated particle dispersion liquid.

The methods for producing a toner according to the first and second exemplary embodiments can produce a toner with high transfer efficiency and suppressed color spots by the method described above. The reasons for this are supposed as follows.

There is a method for producing toner particles through aggregation to form aggregated particles and fusion/coalescence of the aggregated particles.

In the fusion/coalescence, toner particles are formed while suppressing the occurrence of coarse particles due to the aggregation of the toner particles. Also, fusion/coalescence is caused to proceed to adjust the circularity of the toner particles within an intended circularity range.

When the coarse particles are mixed in the toner, color spots occur in an image and thus degrade image quality. In addition, when a long time is required for adjusting circularity, that is, when the fusion/coalescence time is elongated, the resin is thermally decomposed, and the decomposition component remains in the toner, thereby decreasing transfer efficiency.

On the other hand, in a usual method for producing a toner, a method proposed as a method for promoting fusion/coalescence of the aggregated particles while suppressing the occurrence of coarse particles is to change the concentration of at least one of an aggregating agent (specifically, a metal salt or the like) and a stabilizer (specifically, a surfactant or the like) in fusion/coalescence (for example, refer to Japanese Unexamined Patent Application Publication No. 2000-131882).

However, in the method described above, when in the fusion/coalescence, the aggregating agent is added, the aggregation/coalescence of the aggregated particles is accelerated, but the occurrence of coarse particles is also accelerated due to an increase in cohesive force between toner particles. When the stabilizer is added for suppressing the occurrence of coarse particles due to the aggregating agent, a large amount of stabilizer is required. This results in remaining of the stabilizer in the toner particles and thus a decrease in charge-injection transfer efficiency.

There is also known a method of adding a mixed aqueous solution of an acid and a surfactant to an aggregated particle dispersion liquid for the purpose of accelerating the fusion/coalescence of the aggregated particles. Also, in this method, excessive aggregation is accelerated by the acid, and thus coarse particles easily occur. In addition, the surfactant remains in the toner particles, thereby decreasing the charge-injection transfer efficiency.

In the method for producing a toner, the base having volatility is used as, for example, a resin neutralizing agent in producing resin particles and as an aggregation-terminating agent for terminating aggregation by increasing the pH of the dispersion liquid in aggregation.

That is, in the fusion/coalescence, the aggregated particles are fused/coalesced in the presence of the base having volatility.

In addition, when in the fusion/coalescence, the amount of the base having volatility in the dispersion liquid can be decreased, the pH of the dispersion liquid is decreased, and thus the fusion/coalescence of the aggregated particles is accelerated. Thus, the aggregating agent or acid is not added or the amount thereof can be decreased, and thus the occurrence of coarse particles can be suppressed.

In addition, the amount of the surfactant added can be decreased because the occurrence of coarse particles is suppressed, and thus the remaining of the surfactant in the toner particles is suppressed. In addition, an attempt can be made to shorten the fusion/coalescence time due to a decrease in the amount of the base having volatility, and thus thermal decomposition of the resin is decreased, thereby suppressing the remaining of decomposition component in the toner particles. Consequently, a decrease in charge-injection transfer efficiency is suppressed.

Therefore, in the method for producing a toner according to the first exemplary embodiment, in the fusion/coalescence, the amount of the base having volatility in the dispersion liquid is decreased by satisfying at least one of the conditions (1) to (3) described above. Consequently, the occurrence of coarse particles and a decrease in charge-injection transfer efficiency are suppressed.

Specifically, under the condition (1), the fusion/coalescence tank used has one or plural openings provided at a specific opening area ratio in an upper portion thereof, and the volatilized base is discharged to the outside of the tank system from the openings. Thus, in the fusion/coalescence, the amount of the base having volatility in the dispersion liquid is decreased.

Under the condition (2), volatilization of the base in the dispersion liquid is accelerated by reducing the pressure in the fusion/coalescence tank. Thus, in the fusion/coalescence, the amount of the base having volatility in the dispersion liquid is decreased.

Under the condition (3), volatilization of the base in the dispersion liquid is accelerated by blowing a gas into the fusion/coalescence tank. Thus, in the fusion/coalescence, the amount of the base having volatility in the dispersion liquid is decreased.

While in the method for producing a toner according to the second exemplary embodiment, the amount of the base in the aggregated particle dispersion liquid at the time of reaching the fusion/coalescence temperature of the aggregated particle dispersion liquid is 10% by mass or more and 98% by mass or less relative to the amount of the base in the aggregated particle dispersion liquid at the start of heating of the aggregated particle dispersion liquid.

Therefore, in the fusion/coalescence, the amount of the base having volatility in the dispersion liquid is decreased, thereby suppressing the occurrence of coarse particles.

In addition, the amount of the surfactant added can also be decreased because the occurrence of coarse particles is suppressed, and thus the remaining of the surfactant in the toner particles is suppressed. In addition, an attempt can be made to shorten the fusion/coalescence time due to a decrease in the amount of the base having volatility, and thus thermal decomposition of the resin is decreased, thereby suppressing the remaining of the decomposition component in the toner particles. As a result, a decrease in charge-injection transfer efficiency is suppressed.

Therefore, it is supposed that the methods for producing a toner according to the first and second exemplary embodiments produce a toner having high transfer efficiency and suppressed color spots by the method described above.

The method for producing a toner (also referred to as the method for producing a toner according to the exemplary embodiment to the present disclosure) corresponding to both methods for producing a toner according to the first and second exemplary embodiments is described in detail below. However, an example of the method for producing a toner of the present disclosure may be a method for producing a toner corresponding to one of the methods for producing a toner according to the first and second exemplary embodiments.

The method for producing a toner according to the exemplary embodiment of the present disclosure includes aggregation to form the aggregated particles by aggregating at least the resin particles, and fusing/coalescing the aggregated particles.

Hereinafter, a method for producing toner particles containing a coloring agent and a release agent is described as an example, but the coloring agent and the release agent are used if required, and other additives other than the coloring agent and the release agent may be used.

The resin particles are particles serving as a binder resin in the resultant toner particles.

(Preparation of Particle Dispersion Liquid)

The method for producing a toner according to the exemplary embodiment of the present disclosure includes preparing a resin particle dispersion, a coloring agent particle dispersion liquid, and a release agent particle dispersion liquid, which are used in aggregation.

Resin Particle Dispersion Liquid

The resin particle dispersion liquid is prepared by, for example, dispersing the resin particles in a dispersion medium using a surfactant.

The dispersion medium used in the resin particle dispersion liquid is, for example, an aqueous medium.

Examples of the aqueous medium include water such as distilled water, ion exchange water, and the like, alcohols, and the like. These may be used alone or in combination of two or more.

Examples of the surfactant include anionic surfactants such as sulfate ester salt-based, sulfonate ester salt-based, phosphate salt-based, and soap-based surfactants, and the like; cationic surfactants such as amine-type and quaternary ammonium salt-type ones, and the like; and nonionic surfactants such as polyethylene glycol-based, alkylphenol ethylene oxide adduct-based, and polyhydric alcohol-based surfactants, and the like. Among these, anionic surfactants and cationic surfactants are particularly used. A nonionic surfactant may be used in combination with an anionic surfactant or cationic surfactant.

These surfactants may be used alone or in combination of two or more.

Examples of a method for dispersing the resin particles in the dispersion medium in the resin particles dispersion liquid include general dispersion methods such as a rotary shear homogenizer, a ball mill having media, a sand mill, a dyno-mill, and the like. Also, the resin particles may be dispersed in the resin particle dispersion liquid by, for example, using a phase-inversion emulsification method according to the type of the resin particles.

Herein, the resin particle dispersion liquid is preferably produced by a phase-inversion emulsification method. That is, the method for producing a toner according to the exemplary embodiment preferably includes evaporating under vacuum a phase-inversion emulsified liquid, which is prepared by phase-inversion emulsifying a resin using an organic solvent and an aqueous medium, to remove the organic solvent from the phase-inversion emulsified liquid, thereby forming the dispersion liquid containing the resin particles. In forming the dispersion liquid containing the resin particles, the resin is preferably neutralized by using the base having volatility as a neutralizer.

In the phase-inversion emulsification method, when the base having volatility is used as the neutralizer, the base is contained in the resultant resin particles. In this state, when an attempt is made to decrease the amount of the base in the fusion/coalescence, fusion/coalescence is accelerated to the inside of the resin particles. As a result, the occurrence of coarse particles is suppressed, and thus the amount of the acid, surfactant, or the like used is decreased. In addition, an attempt can be made to shorten the fusion/coalescence time. Consequently, a toner having high transfer efficiency and suppressed color spots can be easily produced.

First, the phase-inversion emulsified liquid is prepared by the phase-inversion emulsification method.

The phase-inversion emulsification method is a method in which a water medium (that is, a W phase) is poured into a resin oil phase dispersion (that is, a resin solution serving as an O phase) as a continuous phase prepared by dissolving a resin in an organic solvent, which can dissolve the resin, to cause resin conversion (so-called phase-inversion) from W/O to O/W, thereby converting the oil phase dispersion to a discontinuous phase and dispersing the resin in a particle form in the water medium, Examples of a method for producing the phase-inversion emulsified illiquid include the following.

1) A phase-inversion emulsification method including dissolving a resin in an organic solvent, neutralizing the resin by adding a neutralizer to the resultant resin solution, and adding a water medium to the resin solution.
2) A phase-inversion emulsification method including dissolving and neutralizing a resin in a solvent containing an organic solvent and a neutralizer, and then adding a water medium to the resultant resin solution.
3) A phase-inversion emulsification method including dissolving and neutralizing a resin in a solvent containing an organic solvent, a neutralizer, and a water medium, and then adding a water medium to the resultant resin solution.

The phase-inversion emulsified liquid is produced by using a known emulsifying apparatus such as an emulsifying tank with a stirring blade or the like.

When the resin is dissolved in the organic solvent, an aqueous medium and a neutralizer other than the resin and the organic solvent may be mixed.

The order of addition of the resin and the organic solvent to the emulsifying tank is not particularly limited, but when the resin is easily dissolved in the organic solvent, it is preferred from the viewpoint of the dissolution time that all organic solvents or some of the organic solvents are added, and then the resin is added.

A pipe used for adding the resin to the emulsifying tank can be freely selected according to the diameter of ground resin to be added. For example, a pipe moved up and down to a lower portion of the emulsifying tank may be used for suppressing scattering of dust during the addition of the resin.

The position, number, and shape of nozzles through which water is added to the resin solution prepared by dissolving the resin in the organic solvent are not particularly limited, and for example, the nozzles may be immersed in a liquid. In a large-scale apparatus, water is preferably added by using two or more plural pipes or added by using nozzles of a shower-type head so as to be scattered on the liquid surface from an upper portion of the emulsifying tank.

Next, the organic solvent is removed from the phase-inversion emulsified liquid. Specifically, the organic solvent is removed from the phase-inversion emulsified liquid by, for example, vacuum evaporation.

In vacuum evaporation, the organic solvent is removed from the phase-inversion emulsified liquid by evaporating the organic solvent and the water medium under stirring and heating. As a result, the resin particle dispersion liquid is obtained.

Usable examples of a vacuum evaporation method include known methods such as a vacuum evaporation method of bubbling with inert gas using a vacuum evaporation tank with a stirring device, a vacuum evaporation method referred to as a "wall wetter" in which the phase-inversion emulsified liquid in the vacuum evaporation tank is lifted up to form a liquid film on a heat transfer surface above the liquid surface in the tank, and the like.

Next, various materials used in the phase-inversion emulsification method are described.

Resin

The resin may be a phase-inversion emulsifiable resin. Examples of the resin include vinyl resins composed of homopolymers of monomers, such as styrenes (for example, styrene, para-chlorostyrene, α-methylstyrene, and the like), (meth)acrylate esters (for example, methyl acrylate, ethyl acrylate, n-propyl acrylate, n-butyl acrylate, lauryl acrylate, 2-ethylhexyl acrylate, methyl methacrylate, ethyl methacrylate, n-propyl methacrylate, lauryl methacrylate, 2-ethylhexyl methacrylate, and the like), ethylenically unsaturated nitriles (for example, acrylonitrile, methacrylonitrile, and the like), vinyl ethers (for example, vinyl methyl ether, vinyl isobutyl ether, and the like), vinyl ketones (vinyl methyl ketone, vinyl ethyl ketone, vinyl isopropenyl ketone, and the like), olefins (for example, ethylene, propylene, butadiene, and the like), and the like, or copolymers including combination of two or more these monomers.

Other examples of the resin include non-vinyl resins such as an epoxy resin, a polyester resin, a polyurethane resin, a polyamide resin, a cellulose resin, a polyether resin, a modified rosin, and the like, a mixture of the non-vinyl resin and the vinyl resin, a graft polymer produced by polymerizing the vinyl monomer in coexistence of these resins, and the like.

These resins may be used alone or in combination of two or more.

The resin is preferably a resin having a polar group such as a carboxyl group, a sulfonate group, a hydroxyl group, or the like, and particularly preferably a resin having an acid value.

An amorphous resin is preferably applied as the resin. However, a crystalline resin (for example, a crystalline polyester resin) may be applied.

The "amorphous resin" represents a resin having only a stepwise endothermic change, not a clear endothermic peak, in thermal analysis measurement using differential scanning calorimetry (DSC), and being a solid at room temperature which is thermally plasticized at a temperature equal to or higher than the glass transition temperature.

On the other hand, the "crystalline resin" represents a resin having a clear endothermic peak, not a stepwise endothermic change, in differential scanning calorimetry (DSC). Specifically, for example, the "crystalline resin" represents a resin having an endothermic peak half width within 10° C. measured at a heating rate of 10° C./min, and the "amorphous resin" represents a resin having a half width of over 10° C. or a resin with which a clear endothermic peak is not observed.

The amorphous resin is described.

Examples of the amorphous resin include known amorphous resins such as an amorphous polyester resin, an amorphous vinyl resin (for example, a styrene acrylic resin or the like), an epoxy resin, a polycarbonate resin, a polyurethane resin, and the like. Among these, an amorphous polyester resin and an amorphous vinyl resin (particularly a styrene acrylic resin) are preferred, and an amorphous polyester resin is more preferred.

A preferred form of the amorphous resin contains a combination of an amorphous polyester resin and a styrene acrylic resin. Also, a preferred form applied to the amorphous resin is an amorphous resin having an amorphous polyester resin segment and a styrene acrylic resin segment.

Amorphous Polyester Resin

Examples of the amorphous polyester resin include a polycondensate of polyvalent carboxylic acid and polyhydric alcohol. A commercial product may be used as the amorphous polyester resin, or a synthetic product may be used.

Examples of the polyvalent carboxylic acid include aliphatic dicarboxylic acids (for example, oxalic acid, malonic acid, maleic acid, fumaric acid, citraconic acid, itaconic acid, glutaconic acid, succinic acid, alkenyl succinic acid, adipic acid, sebacic acid, and the like), alicyclic dicarboxylic acids (for example, cyclohexane dicarboxylic acid and the like), aromatic dicarboxylic acids (for example, terephthalic acid, isophthalic acid, phthalic acid, naphthalene dicarboxylic acid, and the like), anhydrides thereof, and lower (for example, 1 or more and 5 less carbon atoms) alkyl esters thereof. Among these, aromatic dicarboxylic acids are preferred as the polyvalent carboxylic acid.

The polyvalent carboxylic acid may be a combination of dicarboxylic acid and a tri- or higher-valent carboxylic acid having a crosslinked structure or a branched structure. Examples of the tri- or higher-valent carboxylic acid include trimellitic acid and pyromellitic acid, anhydrides thereof, and lower (for example, 1 or more and 5 less carbon atoms) alkyl esters thereof, and the like.

The polyvalent carboxylic acids may be used alone or in combination of two or more.

Examples of the polyhydric alcohol include aliphatic diols (for example, ethylene glycol, diethylene glycol, triethylene glycol, propylene glycol, butane diol, hexanediol, neopentyl glycol, and the like), alicyclic diols (for example, cyclohexanediol, cyclohexanemethanol, hydrogenated bisphenol A, and the like), and aromatic diols (for example, bisphenol A ethylene oxide adduct, bisphenol A propylene oxide adduct, and the like). Among these, aromatic diols and alicyclic diols are preferred as polyhydric alcohols, and aromatic diols are more preferred.

A polyhydric alcohol may be combination of diol and tri- or higher-polyhydric alcohol having a crosslinked structure or branched structure. Examples of tri- or higher-polyhydric alcohol include glycerin, trimethylolpropane, and pentaerythritol.

The polyhydric alcohols may be used alone or in combination or two or more.

The amorphous polyester resin is produced by a known production method. Specifically, an example of the method includes reaction at a polymerization temperature of 180° C. or more and 230° C. or less and, if required, under reduced pressure in the system, while the water and alcohol produced during condensation are removed. When the monomer as a raw material is not dissolved or incompatible at the reaction temperature, the monomer may be dissolved by adding a solvent having a high boiling point as a solubilizer. In this case, polycondensation reaction is performed while evaporating off the solubilizer. When a monomer having poor compatibility is present in copolymerization reaction, the monomer having poor compatibility is previously condensed with an acid or alcohol to be condensed with the monomer, and then polycondensed with a main component.

The characteristics of the resin are described.

The acid value of the resin is preferably 5 mgKOH/g or more and 40 mgKOH/g or less, more preferably 8 mgKOH/g or more and 20 mgKOH/g or less, and still more preferably 10 mgKOH/g or more and 16 mgKOH/g or less.

That is, the resin particles are preferably particles containing a resin having an acid value of 5 mgKOH/g or more and 40 mgKOH/g or less.

The resin having an acid value of 5 mgKOH/g or more and 40 mgKOH/g or less is preferably a polyester resin.

When a resin (particularly a polyester resin) having an acid value within the range described above is used, excessive fusion of the aggregated particles proceeds in the fusion/coalescence, and thus coarse particles easily occur. However, in the exemplary embodiment of the present disclosure, even when a resin (particularly a polyester resin) having an acid value within the range described above is used, the occurrence of coarse particles is easily suppressed. As a result, the occurrence of color spots is easily suppressed.

The acid value is determined by a neutralization titration method specified in JIS K0070 (1992). Specifically, the acid value is determined as follows.

An appropriate amount of a sample is collected, and 100 ml of a solvent (diethyl ether/ethanol mixed liquid) and few droplets of an indicator (phenol phthalein solution) are added and shaken sufficiently in a water bath until the sample is completely dissolved. The resultant solution is titrated with a 0.1 mol/l potassium hydroxide ethanol solution, and a time when the light pink color of the indicator continues for 30 seconds is determined as an end point. The acid value A is calculated by $A=(B\times f\times 5.611)/S$ wherein A is the acid value, S (g) is the sample amount, B (ml) is the amount of 0.1 mol/l potassium hydroxide ethanol solution used, and f is the factor of the 0.1 mol/l potassium hydroxide ethanol solution.

The glass transition temperature (Tg) of the resin is preferably 50° C. or more and 80° C. or less and more preferably 50° C. or more and 65° C. or less.

The glass transition temperature is measured by using a differential scanning calorimeter (manufactured by Mac Science Ltd.: DSC3110, thermal analysis system 001) according to JIS 7121-1987. The temperature of a detection portion of this apparatus is corrected by using the melting point of a mixture of indium and zinc, and the quantity of heat is corrected by using the melting head of indium. The sample is placed in an aluminum-made pan, and the aluminum-made pan containing the sample and an empty aluminum-made pan for reference are set and measured at a heating rate of 10° C./min.

The temperature at the intersection point of extended lines of the base line and the rising line in an endothermic portion of the DSC curve obtained by the measurement is considered as the glass transition temperature.

The weight-average molecular weight (Mw) of the resin is preferably 5,000 or more and 1,000,000 or less, and more preferably 7,000 or more and 500,000 or less.

The number-average molecular weight (Mn) of the resin is preferably 2,000 or more and 100,000 or less.

The molecular weight distribution Mw/Mn of the resin is preferably 1.5 or more and 100 or less and more preferably 2 or more and 60 or less.

The weight-average molecular weight and the number-average molecular weight are measured by gel permeation chromatography (GPC). The GPC molecular weight measurement is performed by using GPC•HLC-8120GPC manufactured by Tosoh Corporation as a measurement apparatus, column TSKgel Super HM-M (15 cm) manufactured by Tosoh Corporation, and THF as a solvent. The weight-average molecular weight and the number-average molecular weight are calculated by using a molecular weight calibration curve formed from the measurement results using a monodisperse polystyrene standard sample.

The amount of the resin used is not particularly limited, but may be properly selected according to the solid content concentration of the resultant resin particle dispersion liquid.

Neutralizer

The base having volatility serving as the neutralizer is, for example, a basic compound which can neutralize a polar group in the resin, such as a carboxyl group, a sulfonate group, a hydroxyl group, or the like.

Specific examples of the base include a low-boiling point organic base.

Examples of the low-boiling point organic base include ammonia, methylamine, dimethylamine, trimethylamine, ethylamine, aziridine, azetidine, oxazole, pyrrolidine, oxadiazole, isoxazole, oxazoline, and the like.

Examples of a base without volatility include a high-boiling point organic base and an inorganic alkali.

Examples of the high-boiling point organic base include triethanolamine, diethanolamine, N-methyldiethanolamine, dimethylethanolamine, and the like.

Examples of the inorganic alkali include alkali metal hydroxides (for example, sodium hydroxide, lithium hydroxide, potassium hydroxide, and the like), alkali metal carbonate salts (for example, sodium carbonate salt, sodium hydrogen carbonate, and the like), ammonia, and the like.

The neutralizer is preferably a weakly basic amine in order to prevent hydrolysis of the resin, and more preferably ammonia. In addition, ammonia is particularly preferably added in the state of an aqueous ammonia solution.

The neutralization rate of the resin by the neutralizer is 60% or more and less than 150%, but from the viewpoint of improving yield and narrowing the particle size distribution, the neutralization rate is preferably 60% or more and less than 145% and more preferably 65% or more and 140% or less.

That is, the neutralizer is used so that the neutralization rate of the resin is put into the range described above.

The neutralization rate of the resin is measured as follows.

The neutralization rate is represented by a calculating formula below, wherein AV [mg-KOH/g-resin] is the acid value of the resin, n is the valency of the neutralizer added (that is, the basic material9, Mwb is the molecular weight of the neutralizer added (that is the basis material), and mb [g] is the amount of the neutralizer (that is, the basis material) added per g of the resin.

$$\text{Neutralization rate of resin [\%]} = mb \times n \times 56.1 \div Mwb \div AV \times 1000$$

Organic Solvent

The organic solvent is, for example, a known solvent applied to phase-inversion emulsification.

In particular, from the viewpoint of improving solubility of the resin, the organic solvent preferably contains one or more organic solvents selected from the group including esters and ketones and one or more organic solvents selected from alcohols.

Examples of esters include ethyl acetate, butyl acetate, propyl acetate, isopropyl acetate, and the like.

Examples of ketones include acetone, methyl ethyl ketone, cyclohexanone, butanone, methyl isobutyl ketone, and the like.

Examples of alcohols include methanol, ethanol, isopropyl alcohols, n-propanol, n-butanol, diacetone alcohol, 2-ethylhexanol, and the like.

Water Medium

For example, water (distilled water, ion exchange water, and the like) is applied as the water medium.

The amount of the water medium added to the oil phase medium prepared by dissolving the resin in the organic solvent represents, for example, an amount which causes phase-inversion emulsification and decreases the amount of waste material produced.

Specifically, the amount of the water medium added is preferably 50% by mass or more and 2000% by mass or less and more preferably 100% by mass or more and 1000% by mass or less relative to the weight of the resin.

Characteristics of Resin Particle Dispersion Liquid

The volume-average particle diameter of the resin particles in the resin particle dispersion liquid is preferably 0.01 μm or more and 1 μm or less, more preferably 0.08 μm or more and 0.8 μm or less, and still more preferably 0.1 μm or more and 0.6 μm or less.

The volume-average particle diameter of the resin particles is measured by using a particle size distribution obtained by measurement using a laser diffraction particle size distribution analyzer (for example, LA-700 manufactured by Horiba Ltd.). The volume-based cumulative distribution is formed from the small-diameter side with respect to divided particle size ranges (channels), and the particle diameter at a cumulation of 50% of the total particles is measured as volume-average particle diameter D50v. The volume-average particle diameter of particles in another dispersion liquid is also measured by the same method.

The solid content concentration of the resin particle dispersion liquid may be properly selected according demand, but is preferably 1% by mass or more and 60% by mass or less, more preferably 5% by mass or more and 50% by mass or less, and still more preferably 10% by mass or more and 50% by mass or less.

Coloring Agent Particle Dispersion Liquid

The coloring agent particle dispersion liquid is, for example, a dispersion liquid prepared by dispersing the coloring agent at least in an aqueous medium.

Examples of the coloring agent include various pigments such as carbon black, chrome yellow, hansa yellow, benzidine yellow, threne yellow, quinoline yellow, pigment yellow, permanent orange GTR, pyrazolone orange, Vulcan orange, watch young red, permanent red, brilliant carmine 3B, brilliant carmine 6B, Dupont oil red, pyrazolone red, lithol red, rhodamine B lake, lake red C, pigment red, rose Bengal, aniline blue, ultramarine blue, Carco oil blue, methylene glue chloride, phthalocyanine blue, pigment blue, phthalocyanine green, malachite green oxalate, and the like, various dyes such as acridine-based, xanthene-based, azo-based, benzoquinone-based, azine-based, anthraquinone-based, thioindigo-based, dioxazine-based, thiazine-based, azomethine-based, indigo-based, phthalocyanine-based, aniline black-based, polymethine-based, triphenylmethane-based, diphenylmethane-based, thiazole-based dyes, and the like.

The coloring agents may be used alone or in combination of two or more.

The coloring agent is dispersed in the water medium by a known method, and for example, preferably used is a media-type disperser such as a rotary shear-type homogenizer, a ball mill, a sand mill, an attritor, or the like, a high-pressure counter collision-type disperser, or the like. The coloring agent particle dispersion liquid may be prepared by dispersing the coloring agent in the water medium using a homogenizer using an ionic surfactant having polarity.

The volume-average particle diameter of the coloring agent is preferably 1 μm or less, more preferably 0.5 μm or less, and particularly preferably 0.01 μm or more and 0.5 μm or less.

The dispersant added for more stabilizing the dispersion stability of the coloring agent in the water medium and decreasing the energy of the coloring agent in a toner is, for example, rosin, a rosin derivative, a coupling agent, a high-molecular dispersant, or the like.

Release Agent Particle Dispersion Liquid

The release agent particle dispersion liquid is a dispersion liquid prepared by dispersing the release agent in at least the aqueous medium.

Examples of the release agent include natural wax such as hydrocarbon-based wax, carnauba wax, rice wax, candelilla wax, and the like; synthetic or mineral/petroleum wax such as montan wax and the like; ester-based wax such as a fatty acid ester, a montanate ester wax, and the like; and the like. The release agent is not limited to these.

The release agents may be used alone or in combination of two or more.

The melting temperature of the release agent is preferably 50° C. or more and 110° C. or less and more preferably 60° C. or more and 100° C. or less.

The melting temperature is determined from a DSC curve obtained by differential scanning calorimetry (DSC) according to "Meting Peak Temperature" described in "Determination of Melting Temperature" of JIS K 7121-1987 "Testing Methods for Transition Temperatures of Plastics".

The release agent is dispersed in the water medium by a known method, for example, preferably using a media-type disperser such as a rotary shear-type homogenizer, a ball mill, a sand mill, an attritor, or the like, a high-pressure counter collision-type disperser, or the like. The release agent particle dispersion liquid may be prepared by dispersing the release agent in the aqueous solvent using a homogenizer using an ionic surfactant having polarity.

The volume-average particle diameter of the release agent is preferably 1 μm or less and more preferably 0.01 μm or more and 1 μm or less.

(Aggregation)

In aggregation, for example, the resin particle dispersion liquid is mixed with the coloring agent particle dispersion liquid and the release agent particle dispersion liquid.

In the mixed dispersion liquid, the resin particles, the coloring agent particles, and the release agent particles are aggregated to form the aggregated particles.

The aggregation is generally performed in the fusion/coalescence tank used for fusion/coalescence described later. However, the aggregation may be performed in another tank.

Specifically, the resin particles, the coloring agent particles, and the release agent particles are hetero-aggregated in the mixed dispersion liquid, to form the aggregated particles having a diameter close to the diameter of the intended toner particles and containing the resin particles, the coloring agent particles, and the release agent particles.

More specifically, for example, the aggregating agent is added to the mixed dispersion liquid, and pH of the mixed dispersion liquid is adjusted to an acid value (for example, pH 2 or more and 5 or less). Then, if required, a dispersion stabilizer is added, and the mixture is heated to the glass transition temperature of the resin particles (specifically, for example, the glass transition temperature of the resin particles−30° C. or more and the glass transition temperature−10° C. or less), aggregating the particles dispersed in the mixed dispersion liquid and forming the aggregated particles.

In the aggregation, for example, the aggregating agent may be added to the mixed dispersion liquid under stirring by a rotary shear-type homogenizer at room temperature (for example, 25° C.), and the pH of the mixed dispersion liquid is adjusted to an acid value (for example, pH 2 or more and 5 or less). Then, if required, a dispersion stabilizer is added, and the mixture is heated as described above.

Examples of the aggregating agent include a surfactant having polarity opposite to that of the surfactant used as the dispersant added to the mixed dispersion liquid, an inorganic metal salt, and a di- or higher-valent metal complex. Among these, an inorganic metal salt is preferred.

Examples of the inorganic metal salt include metal salts such as calcium chloride, calcium nitrate, barium chloride, magnesium chloride, zinc chloride, aluminum chloride, aluminum sulfate, and the like, and inorganic metal salt polymers such as polyaluminum chloride, polyaluminum hydroxide, calcium polysulfide, and the like.

In particular, the aggregating agent is preferably a di- or higher-valent metal salt, more preferably tri- or higher-valent metal salt, and still more preferably a trivalent inorganic aluminum salt. Examples of the trivalent inorganic aluminum salt include aluminum chloride, aluminum sulfate, polyaluminum chloride, polyaluminum hydroxide, and the like.

The aggregation is terminated when the diameter of the aggregated particles reaches the diameter close to the diameter of the intended toner particles.

The aggregation is terminated by adding an alkaline aqueous solution to the dispersion liquid containing the aggregated particles dispersed therein to increase the pH of the dispersion liquid containing the aggregated particles to 7 or more and 9 or less.

The alkaline aqueous solution is preferably at least one selected from the group including an aqueous solution of an alkali metal hydroxide, an aqueous solution of an alkaline-earth metal hydroxide, and an aqueous solution of a chelating agent which chelates the aggregating agent.

Examples of an aqueous solution of an alkali metal hydroxide or an aqueous solution of an alkaline-earth metal hydroxide include an aqueous solution of sodium hydride, an aqueous solution of potassium hydroxide, an aqueous solution of calcium hydride, and an aqueous solution of barium hydride, and an aqueous solution of sodium hydroxide is preferred.

The chelating agent is a chemical material which chelates the aggregating agent. Examples of the chelating agent include oxycarboxylic acids such as tartaric acid, citric acid, gluconic acid, and the like; aminocarboxylic acids such as iminodiacetic acid (IDA), nitrilotriacetic acid (NTA), ethylenediamine tetraacetic acid (EDTA), and the like; and the like.

In addition to the aqueous solution of an alkali metal hydroxide or the aqueous solution of an alkaline-earth metal hydroxide, an aqueous solution of the base having volatility (preferably, an aqueous ammonium solution) may be added as the alkaline aqueous solution to the dispersion liquid containing the aggregated particles dispersed therein. The base added to the dispersion liquid containing the aggregated particles dispersed therein is, for example, an organic base and inorganic alkali exemplified as the neutralizer.

(Fusion/Coalescence)

In the fusion/coalescence, the aggregated particles are fused/coalesced by heating the aggregated particle dispersion liquid in the fusion/coalescence tank which houses the aggregated particle dispersion liquid containing the base having volatility and the aggregated particles dispersed therein.

In addition, the fusion/coalescence satisfies at least one condition of the conditions (1) to (3). In particular, from the viewpoint of improving transfer efficiency and suppressing color sports, the fusion/coalescence preferably satisfies at least one condition of conditions (11) to (13) below.

Condition (11): The fusion/coalescence tank has one or plural openings in an upper portion thereof, and the total area ratio of the openings is 5 $cm^2/m^3$ or more and 8000 $cm^2/m^3$ or less per unit amount of the aggregated particle dispersion liquid.

Condition (12): The aggregated particles are fused/coalesced in the fusion/coalescence tank in a state of reduced pressure within a range of (atmospheric pressure−50) kPa or more and (atmospheric pressure−0.5) kPa or less.

Condition (13): The aggregated particles are fused/coalesced in a state where a gas is blown into the fusion/coalescence tank with a wind volume of 5 $L/(min \cdot m^3)$ or more and 150 $L/(min \cdot m^3)$ per unit amount of the aggregated particle dispersion liquid in the fusion/coalescence tank.

Condition (1)

Figure 1B:
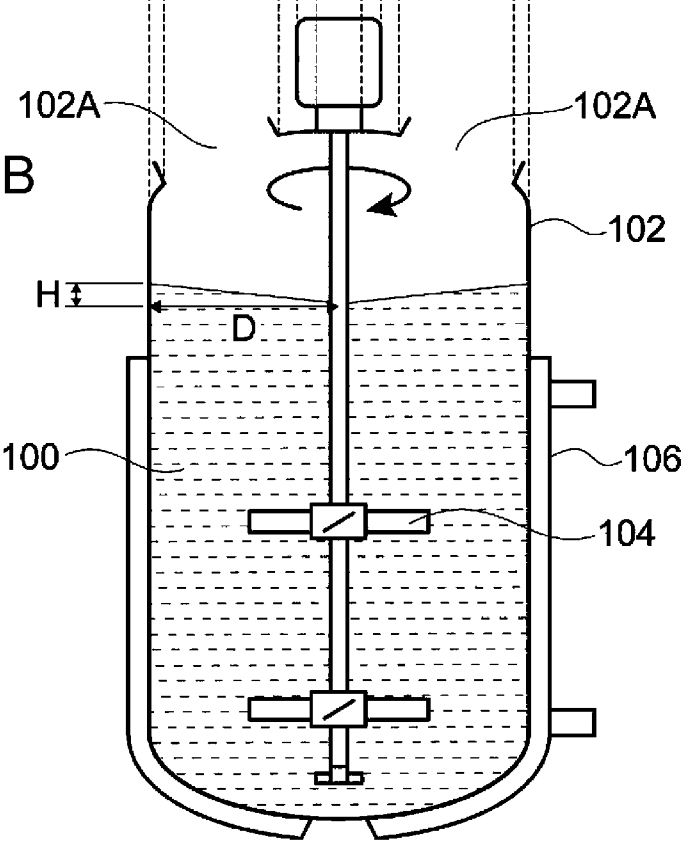

The fusion/coalescence is performed under the condition (1) by, for example, using a fusion/coalescence tank shown in FIGS. 1A and 1B.

FIGS. 1A and 1B are schematic configuration diagrams showing an example of the fusion/coalescence tank used in the method for producing a toner according the example embodiment of the present disclosure. FIG. 1A is a schematic top view of the fusion/coalescence tank and FIG. 1B is a schematic sectional front view thereof.

A fusion/coalescence tank shown in FIGS. 1A and 1B includes a housing tank 102 which houses an aggregated particle dispersion liquid 100 and having openings 102A in an upper portion thereof, a stirrer 104 which stirs the aggregated particle dispersion liquid 100 housed in the housing tank 102, and a jacket 106 which heats, from the outer surface of the housing tank 102, the aggregated particle dispersion liquid 100 housed in the housing tank 102.

In the fusion/coalescence tank shown in FIGS. 1A and 1B, the aggregated particles are fused/coalesced by heating the aggregated particle dispersion liquid 100 housed in the housing tank 102 by the jacket 106 while stirring by the stirrer 104. During the fusion/coalescence, the volatilized base is discharged from the openings 102A provided in the upper portion of the housing tank 102 to the outside of the tank system.

In the fusion/coalescence satisfying the condition (1), the total area ratio of the openings 102A is 5 $cm^2/m^3$ or more, preferably 5 $cm^2/m^3$ or more and 8000 $cm^2/m^3$ or less, and more preferably 100 $cm^2/m^3$ or more and 500 $cm^2/m^3$ or less, per unit amount of the aggregated particle dispersion liquid 100.

An increase in the total area ratio of the openings facilitates the discharge of the volatilized base to the outside of the tank system. However, with an excessive increase in the total area ratio of the openings 102A, the water in the aggregated particle dispersion liquid is easily evaporated during fusion/coalescence, and particularly the amount of a material adhered to the tank wall part of the fusion/coalescence tank is increased. Thus, coarse particles easily occur due to peeling of the adhered material.

Therefore, the total area ratio of the openings 102A is preferably within the range described above.

The number of the openings 102A is preferably 2 or more and 30 or less, more preferably 3 or more and 20 or less, and still more preferably 3 or more and 10 or less.

With a large number of the openings 102A, during the fusion/coalescence, the volatilized base is easily discharged to the outside of the tank system. However, with an excessively large number of the openings 102A, the water in the aggregated particle dispersion liquid is easily evaporated during fusion/coalescence, and particularly the amount of a material adhered to the tank wall part of the fusion/coalescence tank is increased. Thus, coarse particles easily occur due to peeling of the adhered material.

Therefore, the number of the openings 102A is preferably within the range described above.

Condition (2)

Figure 2:
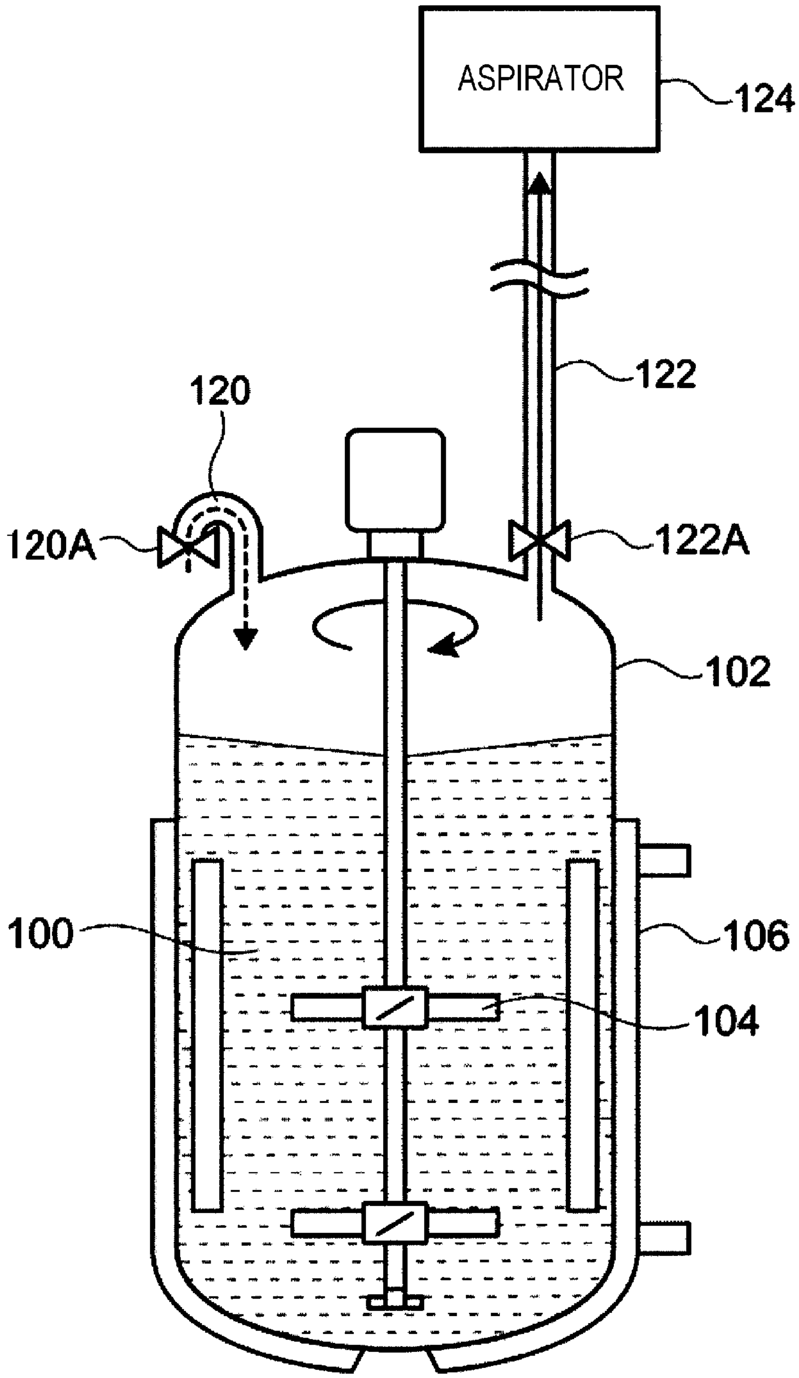
FIG. 2 is a schematic configuration diagram showing another example of a fusion/coalescence tank used in a method for producing an electrostatic charge image developing toner according an example embodiment of the present disclosure.

The fusion/coalescence is performed under the condition (2) by, for example, using a fusion/coalescence tank shown in FIG. 2.

FIG. 2 is a schematic configuration diagram showing another example of the fusion/coalescence tank used in the method for producing a toner according the exemplary embodiment of the present disclosure.

A fusion/coalescence tank shown in FIG. 2 includes a housing tank 102 which houses an aggregated particle dispersion liquid 100, a stirrer 104 which stirs the aggregated particle dispersion liquid 100 housed in the housing tank 102, and a jacket 106 which heats, from the outer surface of the housing tank 102, the aggregated particle dispersion liquid 100 housed in the housing tank 102.

An air inflow pipe 120 and an air discharge pipe 122 are connected to an upper portion of the housing tank 102.

A pressure regulating valve 120A is provided in the course of the air inflow pipe 120.

A pressure regulating valve 122A is provided in the course of the air discharge pipe 122.

An aspirator 124 is provided on the air discharge outlet side of the air discharge pipe 122.

In the fusion/coalescence tank shown in FIG. 2, the aggregated particles are fused/coalesced by heating the aggregated particle dispersion liquid 100 housed in the housing tank 102 by the jacket 106 while stirring by the stirrer 104.

The aspirator 124 is driven, and the air flowing through the pipe is regulated by the pressure regulating valve 120A of the air inflow pipe 120 and the pressure regulating valve 122A in the course of the air discharge pipe 122, thereby reducing the pressure in the housing tank 102. Therefore, the volatilized base is discharged to the outside of the tank system.

In the fusion/coalescence satisfying the condition (2), the reduced pressure in the fusion/coalescence tank is within the range of (atmospheric pressure−0.5) kPa or less, preferably within the range of (atmospheric pressure−50) kPa or more and (atmospheric pressure−0.5) kPa or less, and more preferably within the range of (atmospheric pressure−40) kPa or more and (atmospheric pressure−1.0) kPa or less.

During fusion/coalescence, an increase in pressure reduction in the fusion/coalescence tank facilitate discharge of the volatilized base to the outside of the tank system. However, with an excessive increase in pressure reduction in the fusion/coalescence tank, the water in the aggregated particle dispersion liquid is easily evaporated during fusion/coalescence, and particularly the amount of a material adhered to the tank wall part of the fusion/coalescence tank is increased. Thus, coarse particles easily occur due to peeling of the adhered material.

Therefore, the reduced pressure in the fusion/coalescence tank is preferably within the range described above.

Condition (3)

Figure 3:
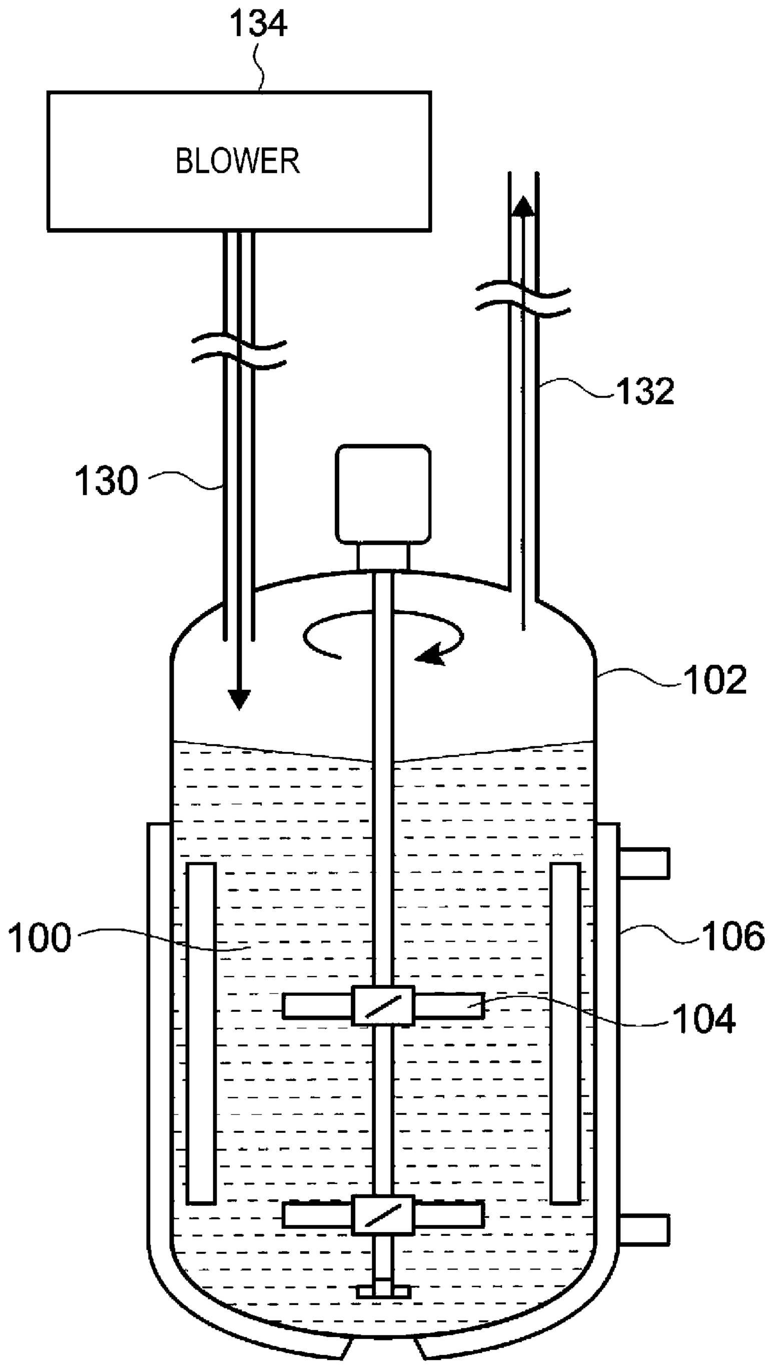
FIG. 3 is a schematic configuration diagram showing a further example of a fusion/coalescence tank used in a method for producing an electrostatic charge image developing toner according an example embodiment of the present disclosure.

The fusion/coalescence is performed under the condition (3) by, for example, using a fusion/coalescence tank shown in FIG. 3.

FIG. 3 is a schematic configuration diagram showing a further example of the fusion/coalescence tank used in the method for producing a toner according the exemplary embodiment of the present disclosure.

A fusion/coalescence tank shown in FIG. 3 includes a housing tank 102 which houses an aggregated particle dispersion liquid 100, a stirrer 104 which stirs the aggregated particle dispersion liquid 100 housed in the housing tank 102, and a jacket 106 which heats, from the outer surface of the housing tank 102, the aggregated particle dispersion liquid 100 housed in the housing tank 102.

An air inlet pipe 130 and an air discharge pipe 132 are connected to an upper portion of the housing tank 102.

A blower 134 is provided on the air inlet side of the air inlet pipe 130.

In the fusion/coalescence tank shown in FIG. 3, the aggregated particles are fused/coalesced by heating the aggregated particle dispersion liquid 100 housed in the housing tank 102 by the jacket 106 while stirring by the stirrer 104.

The blower 134 is driven, and a gas is introduced into the housing tank 102 from the air inlet pipe 130 and discharged from the air discharge pipe 132, thereby blowing the gas into the housing tank 102. Therefore, the volatilized base is discharged to the outside of the tank system.

In the fusion/coalescence satisfying the condition (3), the wind volume of the gas is 5 L/(min·m$^3$) or more, preferably 5 L/(min·m$^3$) or more and 150 L/(min·m$^3$) or less, and more preferably 10 L/(min m$^3$) or more and 130 L/(min·m$^3$) or less, per unit amount of the aggregated particle dispersion liquid in the fusion/coalescence tank.

In the fusion/coalescence, an increase in the wind volume of the gas facilitates discharge of the volatilized base to the outside of the tank system. However, with an excessive increase in the wind volume of the gas, the water in the aggregated particle dispersion liquid is easily evaporated during fusion/coalescence, and particularly the amount of a material adhered to the tank wall part of the fusion/coalescence tank is increased. Thus, coarse particles easily occur due to peeling of the adhered material.

Therefore, the wind volume of the gas is preferably within the range described above.

Amount of Base

In the fusion/coalescence, when at least one condition of the conditions (1) to (3) described above is satisfied, for example, the amount of the base is decreased as follows.

In the fusion/coalescence, the amount of the base having volatility in the aggregated particle dispersion liquid at the time of reaching the fusion/coalescence temperature of the aggregated particle dispersion liquid is 10% by mass or more and 98% by mass or less relative to the amount of the base having volatility in the aggregated particle dispersion liquid at the start of heating of the aggregated particle dispersion liquid. The amount of the base is preferably 10% by mass or more and 98% by mass or less.

A decrease in the amount of the base accelerates fusion/coalescence of the aggregated particles, and an attempt can be made to shorten the fusion/coalescence time, thereby suppressing a decrease in transfer efficiency due to the remaining of the decomposition component of the resin. However, an excessive decrease in the amount of the base excessively accelerates the fusion/coalescence of the aggregated particles, and thus coarse particles easily occur.

Therefore, a rate of decrease in the amount of the base is within the range described above.

In the fusion/coalescence, the amount of the base having volatility in the aggregated particle dispersion liquid at the start of heating of the aggregated particle dispersion liquid is preferably 0.005% by mass or more and 1.0% by mass or less and more preferably 0.01% by mass or more and 0.5% by mass or less relative to the solid content of the aggregated particle dispersion liquid.

With a small amount of the base in the aggregated particle dispersion liquid at the start of heating of the aggregated particle dispersion liquid, fusion/coalescence of the aggregated particles is excessively accelerated, and thus coarse particles easily occur. However, with an excessively small amount of the base in the aggregated particle dispersion liquid at the start of heating of the aggregated particle dispersion liquid, fusion/coalescence of the aggregated particles is excessively accelerated, and thus coarse particles easily occur.

Therefore, the amount of the base in the aggregated particle dispersion liquid at the start of heating of the aggregated particle dispersion liquid is within the range described above.

The amount of the base is measured as follows.

The content of the volatile base component is analyzed by using ICS-2000 manufactured by Nippon Dionex K. K. as an ion chromatograph under conditions below. A sample is obtained by extracting 1.00 g of the aggregated particle dispersion liquid with a filter (HPO20AN manufactured by Advantec Co., Ltd.), and the content of the base having volatility in the sample is measured by cation analysis using the ion chromatograph.

(Conditions for Ion Chromatograph Measurement)

Cation separation column: Ion Pac CS12A manufactured by Nippon Dionex K. K.

Cation guard column: Ion Pac CG12A manufactured by Nippon Dionex K. K.

Eluent: methanesulfonic acid 20 mM

Flow rate: 1 ml/min

Temperature: 30° C.

Detection method: A value obtained by dividing the base content, measured by an electrical conductivity method (suppressor system), by the solid content mass in 1.00 g of the aggregated particle dispersion liquid is shown by percentage and regarded as the base amount (% by mass) relative to the solid content of the aggregated particle dispersion liquid.

In the fusion/coalescence, the pH of the aggregated particle dispersion liquid at the start of heating of the aggregated particle dispersion liquid is 6.5 or more and 9.5 or less (preferably 7.0 or more and 9.0 or less), and the pH of the aggregated particle dispersion liquid at the time of reaching the fusion/coalescence temperature of the aggregated particle dispersion liquid is 6 or more and 9 or less (preferably 6.5 or more and 8.5 or less).

When the pH of each of the aggregated particle dispersion liquid at the start of heating of the aggregated particle dispersion liquid and the aggregated particle dispersion liquid at the time of reaching the fusion/coalescence temperature of the aggregated particle dispersion liquid is within the range described above and when the rate of decrease in the amount of the base is controlled within the range described above, an attempt can be made to shorten the fusion/coalescence time while decreasing the excessive promotion of fusion/coalescence of the aggregated particles.

Other Conditions

In the fusion/coalescence, a mixed aqueous solution of an acid and a surfactant is preferably added to the aggregated particle dispersion liquid reaching the temperature of (glass transition temperature Tg of the resin particles) or more and (glass transition temperature Tg+50° C.) or less.

When the mixed aqueous solution of an acid and a surfactant is added, the temperature of the aggregated particle dispersion liquid is more preferably (glass transition temperature Tg of the resin particles+5° C.) or more and (glass transition temperature Tg+40° C.) or less and still more preferably (glass transition temperature Tg of the resin particles+10° C.) or more and (glass transition temperature Tg+35° C.) or less.

In adding the mixed aqueous solution of an acid and a surfactant, when the temperature of the aggregated particle dispersion liquid is (glass transition temperature Tg of the resin particles+5° C.) or more, the fusion/coalescence of the aggregated particles is accelerated, and an attempt can be made to shorten the fusion/coalescence time, thereby suppressing a decrease in transfer efficiency due to the remaining of the decomposition component of the resin. However, in adding the mixed aqueous solution of an acid and surfactant, the excessively high temperature of the aggregated particle dispersion liquid accelerates the fusion/coalescence of the aggregated particles, and thus coarse particles easily occur.

Therefore, in adding the mixed aqueous solution of an acid and surfactant, the temperature of the aggregated particle dispersion liquid is preferably within the range described above.

The mixed aqueous solution of an acid and surfactant is preferably added to the aggregated particle dispersion liquid, for example, after the passage of 10 minutes or more and 3 hours or less, after the aggregated particle dispersion liquid reaches a temperature within the range described above by heating. This accelerates the fusion/coalescence of the aggregated particles, and an attempt can be made to shorten the fusion/coalescence time and suppress the occurrence of course particles.

Examples of the acid include nitric acid, sulfuric acid, hydrochloric acid, acetic acid, phosphoric acid, carbonic acid, oxalic acid, malonic acid, succinic acid, glutaric acid, adipic acid, pimelic acid, suberic acid, azelaic acid, sebacic acid, maleic acid, fumaric acid, phthalic acid, isophthalic acid, terephthalic acid, citric acid, malic acid, trimellitic acid, acrylic acid, methacrylic acid, maleic acid, cinnamic acid, and the like. The acids may be used alone or in combination of two or more.

Among these, the acid is preferably at least one selected from the group including nitric acid, sulfuric acid, hydrochloric acid, and acetic acid.

Examples of the surfactant include various surfactants such as an anionic surfactant, an amphoteric surfactant, a cationic surfactant, and a nonionic surfactant.

Among these, from the viewpoint of improving storage stability of the resin particle dispersion liquid, the surfactant is preferably an anionic surfactant.

The anionic surfactant is, for example, a carboxylic acid-type, sulfate ester-type, sulfonic acid-type, or phosphate ester-type anionic surfactant.

Examples of the anionic surfactant include fatty acid salts, rosin acid salts, naphthenate salts, ether carboxylate salts, alkenyl succinate salts, primary alkyl sulfate salts, secondary alkyl sulfurate salts, alkylpolyoxyethylene sulfate salts, alkylphenylpolyoxyethylene sulfate salts, monoacylglycerin sulfate salts, acylaminosulfate ester salts, sulfated oil, sulfated fatty acid alkyl esters, α-olefin sulfonate salts, secondary alkane sulfonate salts, α-sulfofatty acid salts, acylisethionate salts, dialkylsulfosuccinate salts, alkylbenzenesulfonate salts, alkylnaphthalenesulfonate salts, alkyldiphenyl ether disulfonate salts, petroleum sulfonate salts, lignin sulfonate salts, alkyl phosphate salts, alkylpolyoxyethylene phosphate salts, alkylphenylpolyoxyethylene phosphate salts, perfluoroalkylcarboxylate salts, perfluoroalkylsulfonate salts, and perfluoroalkylphosphate eaters.

Among these, from the viewpoint of improving dispersion stability of the formed toner particles, the anionic surfactant is more preferably sulfate ester-type or sulfonic acid-type anionic surfactant and particularly preferably a sulfonic acid-type anionic surfactant.

From the viewpoint of easily suppressing the aggregation of the aggregated particles, the ratio A1/B1 of the molar amount A1 of the acid to the molar amount B1 of the surfactant in the mixed aqueous solution is preferably 0.5 or more and 2.0 or less, more preferably 0.7 or more and 1.8 or less, and still more preferably 0.8 or more and 1.5 or less.

The method for adding the acid and the surfactant to the dispersion liquid containing the aggregated particles is not limited. The acid and the surfactant may be added simultaneously or sequentially to the dispersion liquid containing the aggregated particles.

From the viewpoint of easily suppressing the aggregation of the aggregated particles, a mixture previously prepared by mixing the acid and the surfactant is preferably added to the dispersion liquid containing the aggregated particles.

The mixture of the acid and the surfactant is, for example, an aqueous solution or a water dispersion liquid using water as a solvent or a dispersion medium. From the viewpoint of the expression efficiency of the effect and stability of the effective component in the mixture, the total mass of the acid and the surfactant in the total mass of the mixture (for example, an aqueous solution or water dispersion liquid) is preferably 1% by mass or more and 10% by mass or less, more preferably 2% by mass or more and 8% by mass or less, and still more preferably 3% by mass or more and 6% by mass or less.

In the fusion/coalescence, the heating rate from the start of heating of the aggregated particle dispersion liquid to the fusion/coalescence temperature is preferably 0.05° C./min or more and 1° C./min or less, more preferably 0.1° C./min or more and 0.5° C./min or less, and still more preferably 0.1° C./min or more and 0.5° C./min or less.

An increase in the hating rate in the fusion/coalescence facilitates the discharge of the volatilized base to the outside of the tank system. However, an excessive increase in the hating rate increases the temperature of a heat source necessary for heating, and thus the temperature of the aggregated particle dispersion liquid near the heat source (temperature control jacket or heat-conductive coil) is locally increased, thereby easily causing coarse particles.

Therefore, the wind volume of the gas is preferably within the range described above.

In the fusion/coalescence, for example, the aggregated particles are fused/coalesced under stirring of the aggregated particle dispersion liquid in the fusion/coalescence tank.

In addition, in the aggregated particle dispersion liquid under stirring, the ratio (H/D) (refer to FIGS. 1A and 1B) of a difference H between the liquid surface height on the wall surface and the liquid surface height at the stirring shaft in the fusion/coalescence tank to the radius D of the fusion/coalescence tank is preferably 0.01 or more and 2 or less, more preferably 0.05 or more and 1 or less, and still more preferably 0.1 or more and 0.5 or less.

With a high ratio (H/D), that is, a large difference H between the liquid surface height on the wall surface and the liquid surface height at the stirring shaft in the fusion/coalescence tank, the exposed area of the liquid surface of the aggregated particle dispersion liquid is increased, and thus the volatilized base in the fusion/coalescence is easily discharged to the outside of the tank system. However, with an excessively high ratio (H/D), coarse particles easily occur. The reason for this is not known, but an excessively high ratio (H/D) increases the amount of air rolled into the aggregated particle dispersion liquid due to stirring, and a large amount of fine air bubbles are produced in the aggregated particle dispersion liquid. In this case, it is considered that the surfactant contributing to stabilization of the aggregated particles is decreased due to micellization of the surfactant in the air bubble surfaces, and thus the aggregated particles become fused/coarsened particles, thereby easily causing coarse particles.

Therefore, the ratio (H/D) is preferably within the range described above.

The radius D of the fusion/coalescence tank is preferably 100 mm or more and 3000 mm or less and more preferably 500 mm or more and 2000 mm or less.

The radius D of the fusion/coalescence tank represents the radius on the liquid surface at the stirring shaft (refer to FIGS. 1A and 1B).

In addition, the liquid surface height at the stirring shaft represents the distance from the bottom of the fusion/coalescence tank (that is, the housing tank) to the liquid surface of the aggregated particle dispersion liquid at the stirring axis of the stirrer in the fusion/coalescence tank (that is, the housing tank) (refer to FIGS. 1A and 1B).

The toner particles are produced through the process described above.

The toner particles may be produced through the following process. After the aggregated dispersion liquid containing the aggregated particles dispersed therein is prepared, the aggregated particle dispersion liquid is further mixed with the resin particle dispersion liquid containing the resin particles dispersed therein. Consequently, the aggregated particles are aggregated so that the resin particles are further adhered to the surfaces of the aggregated particles, forming second aggregated particles. The second aggregated particles are fused/coalesced by heating the second aggregated particle dispersion liquid containing the second aggregated particles dispersed therein, thereby forming toner particles having a core/shell structure.

The toner particles formed in the solution after the completion of fusion/coalescence is subjected to known washing, solid-liquid separation, and drying to form toner particles in a dry state.

From the viewpoint of chargeability, washing is performed by sufficient substitution washing with ion exchange water. Solid-liquid separation is not particularly limited, but from productivity, suction filtration, pressure filtration, or the like is preferred. Also, drying is not particularly limited, but from the viewpoint of productivity, freeze drying, flush drying, fluidizing drying, or vibration-type fluidizing drying is preferred.

The method for producing a toner according to the exemplary embodiment produces the toner by adding and mixing an external additive with the resultant toner particles in a dry state. Mixing is performed by, for example, a V blender, a Henschel mixer, a Lodige mixer, or the like. Further, if required, coarse particles of the toner may be removed by using a vibration sieve or a wind-force sieve, or the like.

An example of the external additive is inorganic particles. Examples of the inorganic particles include $SiO_2$, $TiO_2$, $Al_2O_3$, CuO, ZnO, $SnO_2$, $CeO_2$, $Fe_2O_3$, MgO, BaO, CaO, $K_2O$, $Na_2O$, $ZrO_2$, $CaO{\cdot}SiO_2$, $K_2O{\cdot}(TiO_2)n$, $Al_2O_3{\cdot}2SiO_2$, $CaCO_3$, $MgCO_3$, $BaSO_4$, $MgSO_4$, and the like.

The surfaces of the inorganic particles as the external additive are preferably hydrophobically treated Hydrophobic treatment is performed by, for example, dipping the inorganic particles in a hydrophobic treatment agent. Examples of the hydrophobic treatment agent include, but are not particularly limited to, a silane coupling agent, silicone oil, a titanate-based coupling agent, an aluminum-based coupling agent, and the like. These may be used alone or in combination or two or more.

The amount of the hydrophobic treatment agent is generally, for example, 1 part by mass or more and 10 parts by mass or less relative to 100 parts by mass of the inorganic particles.

Other examples of the external additive include resin particles (resin particles of polystyrene, polymethyl methacrylate (PMMA), melamine resin, or the like), a cleaning activator (for example, a higher fatty acid metal salt such as zinc stearate or fluorine-based polymer particles), and the like.

The amount of the external additive externally added relative to the toner particles is, for example, preferably 0.01% by mass or more and 5% by mass or less and more preferably 0.01% by mass or more and 2.0% by mass or less.

Characteristics of Toner

The toner particles produced by the method for producing a toner according to the exemplary embodiment may be toner particles having a single-layer structure, or toner particles having a so-called core/shell structure configured by a core part (core particle) and a coating layer (shell layer) which coats the core part.

The toner particles having a core/shell structure is preferably configured to contain, for example, a core part containing a binder resin, and if required, other additives such as a coloring agent, a release agent, etc., and a coating layer configured to contain a binder resin.

The volume-average particle diameter (D50v) of the toner particles is preferably 2 μm or more and 10 μm or less and more preferably 4 μm or more and 8 μm or less.

In addition, various average particle diameters and various particle size distribution indexes of the toner particles are measured by using Coulter Multisizer II (manufactured by Beckman Coulter Inc.) and electrolytic solution ISOTON-II (manufactured by Beckman Coulter Inc.).

In measurement, 0.5 mg or more and 50 mg or less of a measurement sample is added to 2 ml of a 5% aqueous solution of a surfactant (preferably sodium alkylbenzene sulfonate) as a dispersant. The resultant mixture is added to 100 ml or more and 150 ml or less of the electrolytic solution.

The electrolytic solution in which the sample is suspended is dispersed for 1 minute by using an ultrasonic disperser, and a particle size distribution of particles having particle diameters within a range of 2 μm or more and 60 μm or less is measured by Coulter Multisizer II using an aperture having an aperture diameter of 100 μm. The number of particles sampled is 50000.

Volume-based and number-based cumulative distributions are formed from the small-diameter side with respect to the particle size ranges (channels) divided based on the measured particle size distribution. In addition, the particle diameters at a cumulation of 16% are defined as volume particle diameter D16v and number particle diameter D16p, the particle diameters at a cumulation of 50% are defined as volume-average particle diameter D50v and cumulative number-average particle diameter D50p, and the particle diameters at a cumulation of 84% are defined as volume particle diameter D84v and number particle diameter D84p.

By using these values, the volume particle size distribution index (GSDv) is calculated as $(D84v/D16v)^{1/2}$, and the number particle size distribution index (GSDp) is calculated as $(D84p/D16p)^{1/2}$.

The average circularity of the toner particles is preferably 0.94 or more and 1.00 or less and more preferably 0.95 or more and 0.98 or less.

The average circularity of the toner particles is determined by (equivalent circle perimeter)/(perimeter) [(perimeter of a circle having the same projection area as a particle image)/(perimeter of a particle projection image)]. Specifically, a value is measured by the following method.

First, toner particles to be measured are collected by suction to form a flat flow. A particle image is taken in as a still image by instantly emitting strobe light. The circularly is determined by image analysis of the particle image using a flow-type particle image analyzer (FPIA-3000 manufactured by Sysmex Corporation). The number of particles sampled for measuring average circularity is 3500.

When the toner contains external additives, the toner to be measured is dispersed in water containing a surfactant, and then the external additives are removed by ultrasonic treatment, producing the toner particles.

EXAMPLES

Examples of the present disclosure are described below, but the present disclosure is not limited to the examples. In description below, all "parts" and "%" are on mass basis unless otherwise specified.

<Preparation of Resin Particle Dispersion Liquid>

(Preparation of Polyester Resin Particle Dispersion Liquid (1))

[Synthesis Polyester Resin (1)]

In a reactor provided with a stirrer, a thermometer, a condenser, and a nitrogen gas inlet tube, 80 molar parts of polyoxypropylene (2,2)-2,2-bis(4-hydroxyphenyl)propane, 10 molar parts of ethylene glycol, 10 molar parts of cyclohexanediol, 80 molar parts of terephthalic acid, and 10 molar parts of isophthalic acid, and 10 molar parts of n-dodecenyl succinic acid are charged, and the inside of the reactor is substituted by dry nitrogen gas. Then, 0.25 parts by mass of titanium tetrabutoxide as a catalyst is charged relative to 100 parts by mass of the monomer components. The resultant mixture is reacted at 170° C. for 3 hours under a nitrogen gas stream, and the temperature is further increased to 210° C. over 1 hour. In addition, the pressure in the reactor is reduced to 3 kPa, and reaction is performed for 13 hours under reduced pressure, producing a polyester resin (1). The glass transition temperature of the resultant resin measured by using a differential scanning calorimeter (DSC) is 45° C. Also, the acid value is 15 mgKOH/g.

[Preparation of Polyester Resin Particle Dispersion Liquid]

Next, in a 3-liter jacketed reactor (manufactured by Tokyo Rikakiki Co., Ltd.: BJ-30N) provided with a condenser, a thermometer, a water dropping device, and an anchor blade, 200 parts by mass of polyester resin, 100 parts by mass of methyl ethyl ketone, and 70 parts by mass of isopropyl alcohol are added, and the resin is dissolved by stirring and mixing at 100 rpm while being maintained at 70° C. by a water-circulating constant temperature bath. Then, the number of stirring rotations is changed to 150 rpm, the water-circulating constant temperature bath is set to 66° C. Further, 10 parts of 10% ammonia water (reagent) is charged over 10 minutes, and a total of 600 parts by mass of ion exchange water controlled to 66° C. is added dropwise at a rate of 5 parts by mass/min to cause phase-inversion, thereby producing an emulsified liquid. Then, 600 parts of the resultant emulsified liquid and 525 parts of ion exchange water are added in a 2-liter eggplant flask and set to an evaporator (manufactured by Tokyo Rikakiki Co., Ltd.) provided with a vacuum control unit through a trap ball. The resultant mixture is heated by a hot water bath of 60° C. under rotation of the eggplant flask, and the pressure is reduced to 7 kPa with caution paid toward bumping, removing the solvent. When the amount of the solvent recovered is 825 parts, the pressure is returned to atmospheric pressure, and the eggplant flask is cooled with water to obtain a dispersion liquid. Then, ion exchange water is added to prepare a polyester resin particle dispersion liquid (1) with a solid content concentration of 20% by mass.

(Preparation of Polyester Resin Particle Dispersion Liquid (2))

In synthesizing a polyester resin, 0.08 parts by mass of titanium tetrabutoxide as a catalyst is charged relative to 100 parts by mass of the monomer components. The resultant mixture is reacted at 170° C. for 8 hours under a nitrogen gas stream, and then the temperature is further increased to 210° C. over 1 hour. In addition, the pressure in the reactor is reduced to 3 kPa, and stirring reaction is performed for 36 hours under reduced pressure, producing a polyester resin (2). The glass transition temperature of the resultant resin measured by using a differential scanning calorimeter (DSC) is 65° C. Also, the acid value is 3 mgKOH/g. Excepting this, the same method as for the polyester resin particle dispersion liquid (1) is used for preparing a polyester resin particle dispersion liquid (2).

(Preparation of Polyester Resin Particle Dispersion Liquid (3))

In synthesizing a polyester resin, 0.1 parts by mass of titanium tetrabutoxide as a catalyst is charged relative to 100 parts by mass of the monomer components. The resultant mixture is reacted at 170° C. for 6 hours under a nitrogen gas stream, and then the temperature is further increased to 210° C. over 1 hour. In addition, the pressure in the reactor is reduced to 3 kPa, and stirring reaction is performed for 30 hours under reduced pressure, producing a polyester resin (3). The glass transition temperature of the resultant resin measured by using a differential scanning calorimeter (DSC) is 58° C. Also, the acid value is 5 mgKOH/g. Excepting this, the same method as for the polyester resin particle dispersion liquid (1) is used for preparing a polyester resin particle dispersion liquid (3).

(Preparation of Polyester Resin Particle Dispersion Liquid (4))

In synthesizing a polyester resin, 0.6 parts by mass of titanium tetrabutoxide as a catalyst is charged relative to 100 parts by mass of the monomer components. The resultant mixture is reacted at 170° C. for 3 hours under a nitrogen gas stream, and then the temperature is further increased to 210° C. over 1 hour. In addition, the pressure in the reactor is reduced to 3 kPa, and stirring reaction is performed for 10 hours under reduced pressure, producing a polyester resin (4). The glass transition temperature of the resultant resin measured by using a differential scanning calorimeter (DSC) is 42° C. Also, the acid value is 40 mgKOH/g. Excepting this, the same method as for the polyester resin particle dispersion liquid (1) is used for preparing a polyester resin particle dispersion liquid (4).

(Preparation of Polyester Resin Particle Dispersion Liquid (5))

In synthesizing a polyester resin, 0.7 parts by mass of titanium tetrabutoxide as a catalyst is charged relative to 100 parts by mass of the monomer components. The resultant mixture is stirred and reacted at 170° C. for 3 hours under a nitrogen gas stream, and then the temperature is further increased to 210° C. over 1 hour. In addition, the pressure in the reactor is reduced to 3 kPa, and stirring reaction is performed for 10 hours under reduced pressure, producing a polyester resin (5). The glass transition temperature of the resultant resin measured by using a differential scanning calorimeter (DSC) is 40° C. Also, the acid value is 45 mgKOH/g. Excepting this, the same method as for the polyester resin particle dispersion liquid (1) is used for preparing a polyester resin particle dispersion liquid (5).

(Preparation of Polyester Resin Particle Dispersion Liquid (6))

A polyester resin particle dispersion liquid (6) is prepared by the same method as for the polyester resin particle dispersion liquid (1) except that in preparing a polyester resin particle dispersion liquid, 5.0 parts of a 40% aqueous methylamine solution (reagent) is used in place of 10 parts of 10% ammonia water (reagent).

<Preparation of Coloring Agent Particle Dispersion Liquid>

Cyan pigment (manufactured by Dainichiseika Color & Chemicals Mfg. Co., Ltd., Pigment Blue 15:3 (copper phthalocyanine)): 98 parts Anionic surfactant (manufactured by DKS Co., Ltd., Neogen R): 2 parts Ion exchange water: 400 parts The above components are mixed and dissolved and dispersed for 10 minutes by a homogenizer (IKA Ultra-Turrax T50), preparing a coloring agent particle dispersion liquid having a median particle diameter of 0.16 μm and a solid content of 20%.

<Preparation of Release Agent Particle Dispersion Liquid>

Paraffin wax (manufactured by Nippon Seiro Co., Ltd., FNP92, endothermic peak onset 81° C.): 45 parts Anionic surfactant (manufactured by DKS Co., Ltd., Neogen RK): 5 parts Ion exchange water: 200 parts The above components are mixed and heated to 95° C. and then dispersed by using a homogenizer (manufactured by IKA K. K., Ultra-Turrax T50). Then, the resultant dispersion is dispersed by a Manton-Gaulin high-pressure homogenizer (Gaulin Inc.), preparing a release agent particle dispersion liquid (solid content concentration: 20%) containing release agent particles dispersed therein. The volume-average particle diameter of the release agent particles is 0.19 μm.

Examples A1 to A44 and A46 and Comparative Example A1

(Formation of Toner Particles)

Raw materials described below are added to the fusion/coalescence tank shown in FIGS. 1A and 1B, and aggregation and fusion/coalescence are performed as follows. The fusion/coalescence is performed according to the conditions shown in Table 1.

Aggregation

Polyester resin particle dispersion liquid (1): 100 parts by mass

Coloring agent particle dispersion liquid: 10 parts by mass

Release agent particle dispersion liquid: 9 parts by mass

Anionic surfactant (manufactured by Tayca Corporation, Tayca Power BN2060): 1 part by mass Ion exchange water: 200 parts by mass The raw materials described above are placed in a 2L cylindrical stainless vessel serving as the fusion/coalescence tank shown in FIGS. 1A and 1B, and pH is adjusted to 3.0 by adding 3 parts of a 0.3M aqueous nitric acid solution.

Next, 50 parts of a 10% aqueous aluminum sulfate solution is added dropwise as an aggregating agent while shear force is added at 6,000 rpm using Ultra-Turrax (manufactured by IKA Japan K. K.,) and stirred for 5 minutes.

Next, the resultant raw material mixture is heated to 45° C. by a mantle heater and maintained for 30 minutes. Then, a coating resin particle dispersion liquid for coating the aggregated particles, which is previously prepared by mixing 25 parts of a polyester resin dispersion liquid and 10 parts of ion exchange water and adjusting pH to 3.0, is added to the raw material mixture and maintained for 10 minutes. Then, in order to terminate the growth of the coated aggregated particles, the pH of the raw material mixture is controlled to 8.0 by adding a 1M aqueous sodium hydroxide solution.

Fusion/Coalescence

Next, in order to fuse/coalesce the aggregated particles, the temperature is increased until it reaches the fusion/coalescence temperature under the conditions shown in Table 1.

The circularity is measured 30 minutes after the fusion/coalescence temperature is reached, and after the circularity is confirmed to be 0.93, 6 parts of a mixed aqueous solution of 2 mass % nitric acid and 2 mass % surfactant (anionic surfactant (manufactured by Tayca Corporation, Tayca Power BN2060)) is added. Then, average circularity is measured every 30 minutes, and the mixture is maintained until the circularity becomes 0.98. The time until the circularly of the toner becomes 0.98 after the fusion/coalescence temperature is reached is 1 hour.

Then, the mixture is cooled to 20° C. at a rate of 20° C./min. Then, within 60 minutes after cooling, pH is adjusted to 9.5 by using a 1N aqueous sodium hydroxide solution. After pH adjustment, the resultant mixture is filtered, and the residue is sufficiently washed with ion exchange water and then dried, thereby producing toner particles having a volume-average particle diameter of 5.9 μm and an average circularity of 0.98.

(Production of Toner)

There are mixed 100 parts of the toner particles and 1.5 parts of hydrophobic silica (manufactured by Nippon Aerosil Co., Ltd., RY50), and the mixture is mixed at a rotational speed of 10000 rpm for 30 seconds by using a sample mill. Next, the mixture is sieved by using wind-power sieve Hibolter 300 (manufactured by Shin-Tokyo Kikai Co., Ltd., feed rate: 600 kg/h, aperture 38 μm), producing a toner.

(Production of Developer)

The resultant toner and a carrier described below are placed at a ratio of toner:carrier=5:95 (mass ratio) in a V blender and stirred for 20 minutes, producing a developer.

Formation of Carrier

In a pressure kneader, 100 parts of ferrite particles (manufactured by Powdertech Co., Ltd., average particle diameter: 50 μm), and 1.5 parts of polymethyl methacrylate resin (manufactured by Mitsubishi Rayon Co., Ltd., weight-average molecular weight: 95,000, ratio of component with a weight-average molecular weight of 10,000 or less: 5%) are placed together with 500 parts of toluene, and stirred and mixed at room temperature for 15 minutes. Then, toluene is evaporated off by heating to 70° C. under reduced-pressure mixing, and then the residue is cooled and classified by using a sieve of 105 μm, producing a resin-coated ferrite carrier.

Example A45

Toner particles, a toner, and a developer are produced by the same methods as in Example A1 except that in aggregation, 10% ammonia water is used in place of a 1M aqueous sodium hydroxide solution for terminating the growth of the coated aggregated particles.

Examples B1 to B4 and Comparative Example B1

Toner particles, a toner, and a developer are produced by the same methods as in Example A1 except that the raw materials are added to the fusion/coalescence tank shown in FIG. 2 and aggregation and fusion/coalescence are performed, and fusion/coalescence is performed according to the conditions shown in Table 2.

Examples C1 to C4 and Comparative Example C1

Toner particles, a toner, and a developer are produced by the same methods as in Example A1 except that the raw materials are added to the fusion/coalescence tank shown in FIG. 3 and aggregation and fusion/coalescence are performed, and fusion/coalescence is performed according to the conditions shown in Table 3.

<Evaluation>

(Evaluation of Color Spots)

The developer obtained in each of the examples is housed in a developing device of a modified machine (modified machine with a concentration automatic control sensor disconnected from environmental variation) of an image forming apparatus "ApeosPort-IV C5575 (manufactured by Fujifilm Business Innovation Corp.)"

The modified machine of the image forming apparatus is used for continuously outputting an image with an image density Cin of 1% on 5000 sheets of A4 paper in an environment at 10° C. and 15% RH.

Then, an image with an image density Cin of 80% is continuously output on 1000 sheets of A4 paper in an environment at 30° C. and 85% RH.

Then, the presence of color spots due to electrostatic aggregation of toner particles is visually observed in the images finally output on 1000 sheets, and the occurrence of color spots is classified as follows. "A", "B" and "C" are within an allowable range.

A: No color spot occurs.

B: Color ports occur in 1 or more and 3 or less sheets.

C: Color ports occur in 3 or more and 5 or less sheets.

C−: Color ports occur in 6 or more and 8 or less sheets.

D: Color ports occur in 9 or more sheets.

(Evaluation of Transfer Efficiency)

The developer obtained in each of the examples is housed in a modified machine of "700 Digital Color Press" manufactured by Fujifilm Business Innovation Corp.

The modified machine of the image forming apparatus is used for continuously outputting an image with an image area ratio of 5% on 1000 sheets of A4 size plain paper at a development potential adjusted so that the toner mounting amount on a photoreceptor is 5 g/m$^2$ and at low temperature/low humidity (temperature 10° C./relative humidity 20%).

Next, in outputting on each of the sheets, the apparatus is stopped immediately after the toner image on the photoreceptor is transferred to an intermediate transfer belt (that is, before cleaning of the photoreceptor). The toner remaining untransferred on the photoreceptor is collected with a mending tape, and the weight thereof is measured. The initial transfer efficiency is determined by formula (1) below using the toner mounting amount during development and the toner remaining amount, and evaluated according to the following criteria. "A" and "B" are in an allowable range.

Transfer efficiency=(toner mounting amount during development−toner remaining amount)÷toner mounting amount during development×100 Formula (1):

A: The transfer efficiency is 98% or more.

B: The transfer efficiency is 95% or more and less than 98%.

C: The transfer efficiency is 90% or more and less than 95%.

C−: the transfer efficiency is 85% or more and less than 90%.

D: The transfer efficiency is less than 85%.

TABLE 1-1

| | Resin particle | | Fusion/coalescence: At start of heating | | | Fusion/coalescence: Time of reaching fusion/coalescence temperature | | |
|---|---|---|---|---|---|---|---|---|
| | | | Base amount | | | | Base amount | |
| | Type | Acid value mgKOH/g | A % by mass | pH | Heating rate ° C./min | Temperature | B % by mass | pH |
| Example A1 | Polyester resin particle dispersion liquid (1) | 15 | 0.200 | 8.0 | 0.3 | 80 | 0.160 | 7.5 |
| Example A2 | Polyester resin particle dispersion liquid (1) | 15 | 0.200 | 8.0 | 0.3 | 80 | 0.196 | 7.5 |
| Example A3 | Polyester resin particle dispersion liquid (1) | 15 | 0.200 | 8.0 | 0.3 | 80 | 0.020 | 7.5 |
| Example A4 | Polyester resin particle dispersion liquid (1) | 15 | 0.200 | 8.0 | 0.3 | 80 | 0.016 | 7.5 |
| Example A5 | Polyester resin particle dispersion liquid (1) | 15 | 0.200 | 8.0 | 0.3 | 80 | 0.190 | 7.5 |

TABLE 1-1-continued

| | | | | | | | | |
|---|---|---|---|---|---|---|---|---|
| Example A6 | Polyester resin particle dispersion liquid (1) | 15 | 0.200 | 8.0 | 0.3 | 80 | 0.180 | 7.5 |
| Example A7 | Polyester resin particle dispersion liquid (1) | 15 | 0.200 | 8.0 | 0.3 | 80 | 0.170 | 7.5 |
| Example A8 | Polyester resin particle dispersion liquid (1) | 15 | 0.200 | 8.0 | 0.3 | 80 | 0.040 | 7.5 |
| Example A9 | Polyester resin particle dispersion liquid (1) | 15 | 0.200 | 8.0 | 0.3 | 80 | 0.024 | 7.5 |
| Example A10 | Polyester resin particle dispersion liquid (1) | 15 | 0.200 | 8.0 | 0.3 | 80 | 0.018 | 7.5 |
| Example A11 | Polyester resin particle dispersion liquid (1) | 15 | 0.200 | 8.0 | 0.3 | 80 | 0.140 | 7.5 |
| Example A12 | Polyester resin particle dispersion liquid (1) | 15 | 0.200 | 8.0 | 0.3 | 80 | 0.150 | 7.5 |
| Example A13 | Polyester resin particle dispersion liquid (1) | 15 | 0.200 | 8.0 | 0.3 | 80 | 0.156 | 7.5 |
| Example A14 | Polyester resin particle dispersion liquid (1) | 15 | 0.200 | 8.0 | 0.3 | 80 | 0.164 | 7.5 |
| Example A15 | Polyester resin particle dispersion liquid (1) | 15 | 0.200 | 8.0 | 0.3 | 80 | 0.170 | 7.5 |
| Example A16 | Polyester resin particle dispersion liquid (1) | 15 | 0.200 | 8.0 | 0.3 | 80 | 0.180 | 7.5 |
| Example A17 | Polyester resin particle dispersion liquid (1) | 15 | 0.200 | 8.0 | 0.03 | 80 | 0.018 | 7.5 |
| Example A18 | Polyester resin particle dispersion liquid (1) | 15 | 0.200 | 8.0 | 0.05 | 80 | 0.062 | 7.5 |
| Example A19 | Polyester resin particle dispersion liquid (1) | 15 | 0.200 | 8.0 | 0.1 | 80 | 0.140 | 7.5 |
| Example A20 | Polyester resin particle dispersion liquid (1) | 15 | 0.200 | 8.0 | 0.5 | 80 | 0.180 | 7.5 |
| Example A21 | Polyester resin particle dispersion liquid (1) | 15 | 0.200 | 8.0 | 1.0 | 80 | 0.190 | 7.5 |
| Example A22 | Polyester resin particle dispersion liquid (1) | 15 | 0.200 | 8.0 | 1.3 | 80 | 0.196 | 7.5 |

| | | Fusion/coalescence | | | | | | | |
|---|---|---|---|---|---|---|---|---|---|
| | | Temperature of addition | Fusion/coalescence tank | | | | | | |
| | B/A | of mixed aqueous | Total area ratio of | Number of | Radius | Difference in liquid surface | | Evaluation | |
| | % by mass | solution ° C. | opening $cm^2/m^3$ | openings Openings | D mm | height H mm | Ratio (H/D) | Color spot | Transfer efficiency |
| Example A1 | 80 | 80 | 500 | 4 | 1200 | 300 | 0.25 | A | A |
| Example A2 | 98 | 80 | 5 | 4 | 1200 | 300 | 0.25 | C | C |
| Example A3 | 10 | 80 | 8000 | 4 | 1200 | 300 | 0.25 | C | B |
| Example A4 | 8 | 80 | 10000 | 4 | 1200 | 300 | 0.25 | C− | A |
| Example A5 | 95 | 80 | 500 | 1 | 1200 | 300 | 0.25 | B | C− |
| Example A6 | 90 | 80 | 500 | 2 | 1200 | 300 | 0.25 | B | C |
| Example A7 | 85 | 80 | 500 | 3 | 1200 | 300 | 0.25 | A | C |
| Example A8 | 20 | 80 | 500 | 20 | 1200 | 300 | 0.25 | B | B |
| Example A9 | 12 | 80 | 500 | 30 | 1200 | 300 | 0.25 | C | B |
| Example A10 | 9 | 80 | 500 | 35 | 1200 | 300 | 0.25 | C− | B |
| Example A11 | 70 | 43 | 500 | 4 | 1200 | 300 | 0.25 | B | C− |
| Example A12 | 75 | 45 | 500 | 4 | 1200 | 300 | 0.25 | B | C |
| Example A13 | 78 | 50 | 500 | 4 | 1200 | 300 | 0.25 | B | B |
| Example A14 | 82 | 85 | 500 | 4 | 1200 | 300 | 0.25 | C | B |
| Example A15 | 85 | 95 | 500 | 4 | 1200 | 300 | 0.25 | C | C |
| Example A16 | 90 | 98 | 500 | 4 | 1200 | 300 | 0.25 | C− | C |
| Example A17 | 9 | 80 | 500 | 4 | 1200 | 300 | 0.25 | A | C− |
| Example A18 | 31 | 80 | 500 | 4 | 1200 | 300 | 0.25 | A | C |
| Example A19 | 70 | 80 | 500 | 4 | 1200 | 300 | 0.25 | A | B |
| Example A20 | 90 | 80 | 500 | 4 | 1200 | 300 | 0.25 | B | B |
| Example A21 | 95 | 80 | 500 | 4 | 1200 | 300 | 0.25 | C | B |
| Example A22 | 98 | 80 | 500 | 4 | 1200 | 300 | 0.25 | C− | B |

TABLE 1-2

| | | | Fusion/coalescence | | | | | |
|---|---|---|---|---|---|---|---|---|
| | | | At start of heating | | | Time of reaching fusion/ coalescence temperature | | |
| | Resin particle | | Base amount | | | | Base amount | |
| | Type | Acid value mgKOH/g | A % by mass | pH | Heating rate ° C./min | Temperature | B % by mass | pH |
| Example A23 | Polyester resin particle dispersion liquid (1) | 15 | 0.200 | 8.0 | 0.3 | 80 | 0.198 | 7.5 |
| Example A24 | Polyester resin particle dispersion liquid (1) | 15 | 0.200 | 8.0 | 0.3 | 80 | 0.190 | 7.5 |
| Example A25 | Polyester resin particle dispersion liquid (1) | 15 | 0.200 | 8.0 | 0.3 | 80 | 0.182 | 7.5 |
| Example A26 | Polyester resin particle dispersion liquid (1) | 15 | 0.200 | 8.0 | 0.3 | 80 | 0.104 | 7.5 |
| Example A27 | Polyester resin particle dispersion liquid (1) | 15 | 0.200 | 8.0 | 0.3 | 80 | 0.042 | 7.5 |
| Example A28 | Polyester resin particle dispersion liquid (1) | 15 | 0.200 | 8.0 | 0.3 | 80 | 0.024 | 7.5 |
| Example A29 | Polyester resin particle dispersion liquid (2) | 3 | 0.200 | 8.0 | 0.3 | 80 | 0.018 | 7.5 |
| Example A30 | Polyester resin particle dispersion liquid (3) | 5 | 0.200 | 8.0 | 0.3 | 80 | 0.062 | 7.5 |
| Example A31 | Polyester resin particle dispersion liquid (4) | 40 | 0.200 | 8.0 | 0.3 | 80 | 0.192 | 7.5 |
| Example A32 | Polyester resin particle dispersion liquid (5) | 45 | 0.200 | 8.0 | 0.3 | 80 | 0.198 | 7.5 |
| Example A33 | Polyester resin particle dispersion liquid (1) | 15 | 0.002 | 8.0 | 0.3 | 80 | 0.002 | 7.5 |

TABLE 1-2-continued

| | | | | | | | | |
|---|---|---|---|---|---|---|---|---|
| Example A34 | Polyester resin particle dispersion liquid (1) | 15 | 0.005 | 8.0 | 0.3 | 80 | 0.004 | 7.5 |
| Example A35 | Polyester resin particle dispersion liquid (1) | 15 | 1.000 | 8.0 | 0.3 | 80 | 0.750 | 7.5 |
| Example A36 | Polyester resin particle dispersion liquid (1) | 15 | 1.200 | 8.0 | 0.3 | 80 | 0.792 | 7.5 |
| Example A37 | Polyester resin particle dispersion liquid (1) | 15 | 0.200 | 6.0 | 0.4 | 80 | 0.016 | 6.0 |
| Example A38 | Polyester resin particle dispersion liquid (1) | 15 | 0.200 | 6.5 | 0.4 | 80 | 0.024 | 6.5 |
| Example A39 | Polyester resin particle dispersion liquid (1) | 15 | 0.200 | 9.5 | 0.2 | 80 | 0.186 | 8.5 |
| Example A40 | Polyester resin particle dispersion liquid (1) | 15 | 0.200 | 10.0 | 0.2 | 80 | 0.198 | 9.0 |
| Example A41 | Polyester resin particle dispersion liquid (1) | 15 | 0.200 | 8.0 | 0.3 | 80 | 0.018 | 5.6 |
| Example A42 | Polyester resin particle dispersion liquid (1) | 15 | 0.200 | 8.0 | 0.3 | 80 | 0.030 | 6 |
| Example A43 | Polyester resin particle dispersion liquid (1) | 15 | 0.200 | 8.0 | 0.3 | 80 | 0.178 | 9 |
| Example A44 | Polyester resin particle dispersion liquid (1) | 15 | 0.200 | 8.0 | 0.3 | 80 | 0.198 | 9.5 |
| Example A45 | Polyester resin particle dispersion liquid (1) | 15 | 0.650 | 8.0 | 0.3 | 80 | 0.507 | 7.5 |
| Example A46 | Polyester resin particle dispersion liquid (6) | 15 | 0.460 | 8.0 | 0.3 | 80 | 0.437 | 7.5 |
| Comparative Example A1 | Polyester resin particle dispersion liquid (1) | 15 | 0.200 | 8.0 | 0.3 | 80 | 0.200 | 7.5 |

| | Fusion/coalescence | | | | | | | | |
|---|---|---|---|---|---|---|---|---|---|
| | | Temperature of addition | Fusion/coalescence tank | | | | | | |
| | B/A | of mixed aqueous | Total area ratio of | Number of | Radius | Difference in liquid surface | | Evaluation | |
| | % by mass | solution ° C. | opening $cm^2/m^3$ | openings Openings | D mm | height H mm | Ratio (H/D) | Color spot | Transfer efficiency |
| Example A23 | 99 | 80 | 500 | 4 | 1200 | 6 | 0.005 | C− | B |
| Example A24 | 95 | 80 | 500 | 4 | 1200 | 12 | 0.01 | C | B |
| Example A25 | 91 | 80 | 500 | 4 | 1200 | 60 | 0.05 | B | B |
| Example A26 | 52 | 80 | 500 | 4 | 1200 | 1200 | 1.0 | B | C |
| Example A27 | 21 | 80 | 500 | 4 | 1200 | 2400 | 2.0 | C | C |
| Example A28 | 12 | 80 | 500 | 4 | 1200 | 2760 | 2.3 | C− | C |
| Example A29 | 9 | 80 | 500 | 4 | 1200 | 300 | 0.25 | C− | B |
| Example A30 | 31 | 80 | 500 | 4 | 1200 | 300 | 0.25 | C | C |
| Example A31 | 96 | 80 | 500 | 4 | 1200 | 300 | 0.25 | B | C |
| Example A32 | 99 | 80 | 500 | 4 | 1200 | 300 | 0.25 | B | C− |
| Example A33 | 88 | 80 | 500 | 4 | 1200 | 300 | 0.25 | C− | B |
| Example A34 | 85 | 80 | 500 | 4 | 1200 | 300 | 0.25 | C | B |
| Example A35 | 75 | 80 | 500 | 4 | 1200 | 300 | 0.25 | B | C |
| Example A36 | 66 | 80 | 500 | 4 | 1200 | 300 | 0.25 | B | C− |
| Example A37 | 8 | 80 | 500 | 4 | 1200 | 300 | 0.25 | C− | B |
| Example A38 | 12 | 80 | 500 | 4 | 1200 | 300 | 0.25 | C | B |
| Example A39 | 93 | 80 | 500 | 4 | 1200 | 300 | 0.25 | B | C |
| Example A40 | 99 | 80 | 500 | 4 | 1200 | 300 | 0.25 | B | C− |
| Example A41 | 9 | 80 | 500 | 4 | 1200 | 300 | 0.25 | C− | B |
| Example A42 | 15 | 80 | 500 | 4 | 1200 | 300 | 0.25 | C | B |
| Example A43 | 89 | 80 | 500 | 4 | 1200 | 300 | 0.25 | B | C |
| Example A44 | 99 | 80 | 500 | 4 | 1200 | 300 | 0.25 | B | C− |
| Example A45 | 78 | 80 | 500 | 4 | 1200 | 300 | 0.25 | B | C |
| Example A46 | 95 | 80 | 500 | 4 | 1200 | 300 | 0.25 | C | B |
| Comparative Example A1 | 100 | 80 | 3 | 4 | 1200 | 300 | 0.25 | D | D |

TABLE 2

| | Resin particle | | Fusion/coalescence | | | | | |
|---|---|---|---|---|---|---|---|---|
| | | | At start of heating | | | Time of reaching fusion/ coalescence temperature | | |
| | | | Base amount | | | | Base amount | |
| | Type | Acid value mgKOH/g | A % by mass | pH | Heating rate ° C./min | Temperature | B % by mass | pH |
| Example B1 | Polyester resin particle dispersion liquid (1) | 15 | 0.200 | 8.0 | 0.3 | 80 | 0.160 | 7.5 |
| Example B2 | Polyester resin particle dispersion liquid (1) | 15 | 0.200 | 8.0 | 0.3 | 80 | 0.196 | 7.5 |
| Example B3 | Polyester resin particle dispersion liquid (1) | 15 | 0.200 | 8.0 | 0.3 | 80 | 0.020 | 7.5 |
| Example B4 | Polyester resin particle dispersion liquid (1) | 15 | 0.200 | 8.0 | 0.3 | 80 | 0.016 | 7.5 |
| Comparative Example B1 | Polyester resin particle dispersion liquid (1) | 15 | 0.200 | 8.0 | 0.3 | 80 | 0.198 | 7.5 |

TABLE 2-continued

| | Fusion/coalescence B/A % by mass | Temperature of addition of mixed aqueous solution ° C. | Fusion/coalescence tank Reduced pressure kPa | Radius D mm | Difference in liquid surface height H mm | Ratio (H/D) | Evaluation Color spot | Transfer efficiency |
|---|---|---|---|---|---|---|---|---|
| Example B1 | 80 | 80 | 80.0 | 1200 | 300 | 0.25 | A | A |
| Example B2 | 98 | 80 | 100.8 | 1200 | 300 | 0.25 | B | C |
| Example B3 | 10 | 80 | 51.3 | 1200 | 300 | 0.25 | C | B |
| Example B4 | 8 | 80 | 45.00 | 1200 | 300 | 0.25 | C− | C |
| Comparative Example B1 | 99 | 80 | 101.3 | 1200 | 300 | 0.25 | D | D |

TABLE 3

| | Resin particle Type | Acid value mgKOH/g | Fusion/coalescence At start of heating Base amount A % by mass | pH | Heating rate ° C./min | At time of reaching fusion/coalescence temperature Temperature | Base amount B % by mass | pH |
|---|---|---|---|---|---|---|---|---|
| Example C1 | Polyester resin particle dispersion liquid (1) resin | 15 | 0.200 | 8.0 | 0.3 | 80 | 0.160 | 7.5 |
| Example C2 | Polyester resin particle dispersion liquid (1) resin | 15 | 0.200 | 8.0 | 0.3 | 80 | 0.160 | 7.5 |
| Example C3 | Polyester resin particle dispersion liquid (1) | 15 | 0.200 | 8.0 | 0.3 | 80 | 0.160 | 7.5 |
| Example C4 | Polyester resin particle dispersion liquid (1) | 15 | 0.200 | 8.0 | 0.3 | 80 | 0.160 | 7.5 |
| Comparative Example C1 | Polyester resin particle dispersion liquid (1) | 15 | 0.200 | 8.0 | 0.3 | 80 | 0.160 | 7.5 |

| | Fusion/coalescence B/A % by mass | Temperature of addition of mixed aqueous solution ° C. | Fusion/coalescence tank Gas wind volume L/min ·$m^3$ | Radius D mm | Difference in liquid surface height H mm | Ratio (H/D) | Evaluation Color spot | Transfer efficiency |
|---|---|---|---|---|---|---|---|---|
| Example C1 | 80 | 80 | 70 | 1200 | 300 | 0.25 | A | A |
| Example C2 | 98 | 80 | 5 | 1200 | 300 | 0.25 | B | C |
| Example C3 | 10 | 80 | 150 | 1200 | 300 | 0.25 | C | B |
| Example C4 | 8 | 80 | 180 | 1200 | 300 | 0.25 | C− | C |
| Comparative Example C1 | 99 | 80 | 2 | 1200 | 300 | 0.25 | D | D |

The above results indicate that in the examples, a high transfer efficiency is achieved, and color sports are suppressed as compared with the comparative examples.

The foregoing description of the exemplary embodiments of the present disclosure has been provided for the purposes of illustration and description. It is not intended to be exhaustive or to limit the disclosure to the precise forms disclosed. Obviously, many modifications and variations will be apparent to practitioners skilled in the art. The embodiments were chosen and described in order to best explain the principles of the disclosure and its practical applications, thereby enabling others skilled in the art to understand the disclosure for various embodiments and with the various modifications as are suited to the particular use contemplated. It is intended that the scope of the disclosure be defined by the following claims and their equivalents.

What is claimed is:

1. A method for producing an electrostatic charge image developing toner, the method comprising:

forming aggregated particles by aggregating at least resin particles in a dispersion liquid containing the resin particles; and fusing/coalescing the aggregated particles by heating an aggregated particle dispersion liquid containing a base having volatility and the aggregated particles dispersed therein in a fusion/coalescence tank that houses the aggregated particle dispersion liquid, wherein in fusing/coalescing the aggregated particles, at least one of conditions (1) to (3) below is satisfied, Condition (1): the fusion/coalescence tank has one or plural openings in an upper portion thereof, and the total area ratio of the openings is 5 $cm^2/m^3$ or more per unit amount of the aggregated particle dispersion liquid, Condition (2): the aggregated particles are fused/coalesced in the fusion/coalescence tank in a state of reduced pressure within a range of (atmospheric pressure−0.5) kPa or less, Condition (3): the aggregated particles are fused/coalesced in a state where a gas is blown into the fusion/coalescence tank with a wind volume of 5 L/(min·$m^3$) or more per unit amount of the aggregated particle dispersion liquid in the fusion/coalescence tank.

2. The method for producing an electrostatic charge image developing toner according to claim 1, wherein in fusing/coalescing the aggregated particles, at least one of conditions (11) to (13) below is satisfied, Condition (11): the fusion/coalescence tank has one or plural openings in an upper portion thereof, and the total area ratio of the openings is 5 $cm^2/m^3$ or more and 8000 $cm^2/m^3$ or less per unit amount of the aggregated particle dispersion liquid, Condition (12): the aggregated particles are fused/coalesced in the fusion/coalescence tank in a state of reduced pressure within a range of (atmospheric pressure−50) kPa or more and (atmospheric pressure−0.5) kPa or less, Condition (13): the aggregated particles are fused/coalesced in a state where a gas is blown into the fusion/coalescence tank with a wind volume of 5 L/(min·$m^3$) or more and 150 L/(min·$m^3$) per unit amount of the aggregated particle dispersion liquid in the fusion/coalescence tank.

3. The method for producing an electrostatic charge image developing toner according to claim 1, wherein in the Conditions (1) and (11), the number of openings in the upper portion of the fusion/coalescence tank is 2 or more and 30 or less.

4. The method for producing an electrostatic charge image developing toner according to claim 3, wherein in the Conditions (1) and (11), the number of openings in the upper portion of the fusion/coalescence tank is 3 or more and 20 or less.

5. The method for producing an electrostatic charge image developing toner according to claim 1, wherein in fusing/coalescing the aggregated particles, a mixed aqueous solution of an acid and a surfactant is added to the aggregated particle dispersion liquid reaching a temperature of (the glass transition temperature Tg of the resin particles) or more and (the glass transition temperature Tg+50° C.) or less.

6. The method for producing an electrostatic charge image developing toner according to claim 5, wherein when the mixed aqueous solution of an acid and a surfactant is added to the aggregated particle dispersion liquid, the temperature of the aggregated particle dispersion liquid is a temperature of (the glass transition temperature Tg of the resin particles+5° C.) or more and (the glass transition temperature Tg+40° C.) or less.

7. The method for producing an electrostatic charge image developing toner according to claim 1, wherein in fusing/coalescing the aggregated particles, the heating rate from the start of heating of the aggregated particle dispersion liquid to the fusion/coalescence temperature is 0.05° C./min or more and 1° C./min or less.

8. The method for producing an electrostatic charge image developing toner according to claim 7, wherein the heating rate is 0.1° C./min or more and 0.5° C./min or less.

9. The method for producing an electrostatic charge image developing toner according to claim 1, wherein in fusing/coalescing the aggregated particles, the aggregated particles are fused/coalesced under stirring of the aggregated particle dispersion liquid in the fusion/coalescence tank; and in the aggregated particle dispersion liquid under stirring, the ratio (H/D) of a difference H between the liquid surface height on the wall surface and the liquid surface height at a stirring shaft in the fusion/coalescence tank to the radius D of the fusion/coalescence tank is 0.01 or more and 2 or less.

10. The method for producing an electrostatic charge image developing toner according to claim 9, wherein in the aggregated particle dispersion liquid under stirring, the ratio (H/D) of a difference H between the liquid surface height on the wall surface and the liquid surface height at the stirring shaft in the fusion/coalescence tank to the radius D of the fusion/coalescence tank is 0.05 or more and 1 or less.

11. The method for producing an electrostatic charge image developing toner according to claim 1, comprising:

evaporating under vacuum a phase-inversion emulsified liquid, prepared by phase-inversion emulsifying a resin by using an organic solvent and a water medium, to remove the organic solvent from the phase-inversion emulsified liquid, forming a dispersion liquid containing the resin particles, wherein in forming the dispersion liquid containing the resin particles, the resin is neutralized by using a base having volatility as a neutralizer.

12. The method for producing an electrostatic charge image developing toner according to claim 11, wherein the base having volatility is ammonia.

13. The method for producing an electrostatic charge image developing toner according to claim 1, wherein the resin particles are particles containing a resin having an acid value of 5 mgKOH/g or more and 40 mgKOH/g or less.

14. The method for producing an electrostatic charge image developing toner according to claim 13, wherein the resin is a polyester resin.

15. A method for producing an electrostatic charge image developing toner, the method comprising:

forming aggregated particles by aggregating at least resin particles in a dispersion liquid containing the resin particles; and fusing/coalescing the aggregated particles by heating an aggregated particle dispersion liquid containing a base having volatility and the aggregated particles dispersed therein in a fusion/coalescence tank housing the aggregated particle dispersion liquid, wherein in fusing/coalescing the aggregated particles, the amount of the base having volatility in the aggregated particle dispersion liquid at the time of reaching the fusion/coalescence temperature of the aggregated particle dispersion liquid is 10% by mass or more and 98% by mass or less relative to the amount of the base having volatility in the aggregated particle dispersion liquid at the start of heating of the aggregated particle dispersion liquid.

16. The method for producing an electrostatic charge image developing toner according to claim 15, wherein in fusing/coalescing the aggregated particles, the amount of the base having volatility in the aggregated particle dispersion liquid at the start of heating of the aggregated particle dispersion liquid is 0.005% by mass or more and 1.0% by mass or less relative to the solid content of the aggregated particle dispersion liquid.

17. The method for producing an electrostatic charge image developing toner according to claim 15, wherein in fusing/coalescing the aggregated particles, the pH of the aggregated particle dispersion liquid at the start of heating of the aggregated particle dispersion liquid is 6.5 or more and 9.5 or less, and the pH of the aggregated particle dispersion liquid at the time of reaching the fusion/coalescence temperature of the aggregated particle dispersion liquid is 6 or more and 9 or less.

* * * * *